US011715213B2

(12) United States Patent
Leung et al.

(10) Patent No.: US 11,715,213 B2
(45) Date of Patent: Aug. 1, 2023

(54) APPARATUS AND METHODS FOR DETERMINING MULTI-SUBJECT PERFORMANCE METRICS IN A THREE-DIMENSIONAL SPACE

(71) Applicant: Intel Corporation, Santa Clara, CA (US)

(72) Inventors: Nelson Leung, San Jose, CA (US); Jonathan K. Lee, San Carlos, CA (US); Bridget L. Williams, San Francisco, CA (US); Sameer Sheorey, Sunnyvale, CA (US); Amery Cong, San Francisco, CA (US); Mehrnaz Khodam Hazrati, San Jose, CA (US); Sabar Mourad Souag, Beaverton, OR (US); Adam Marek, Gdansk (PL); Pawel Pieniazek, Gdansk (PL); Bogna Bylicka, Gdansk (PL); Jakub Powierza, Gdansk (PL); Anna Banaszczyk-fiszer, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 16/914,232

(22) Filed: Jun. 26, 2020

(65) Prior Publication Data

US 2020/0401793 A1    Dec. 24, 2020

(51) Int. Cl.
*G06V 40/20*   (2022.01)
*G06T 7/246*   (2017.01)
(Continued)

(52) U.S. Cl.
CPC .............. *G06T 7/246* (2017.01); *G06T 7/292* (2017.01); *G06T 7/73* (2017.01); *G06V 10/147* (2022.01);
(Continued)

(58) Field of Classification Search
CPC ......... G06V 40/23; G06T 7/246; G06T 7/292; G06T 7/73
(Continued)

(56) References Cited

U.S. PATENT DOCUMENTS 8,615,105 B1   12/2013   Cheng et al.
9,916,508 B2    3/2018   Pillai et al.
(Continued)

FOREIGN PATENT DOCUMENTS

CN    108108674    6/2018
CN    108629801    10/2018
(Continued)

OTHER PUBLICATIONS

Rhodin et al., "Learning Monocular 3D Human Pose Estimation from Multi-view Images," Mar. 24, 2018, Retrieved from the Internet: <https://arxiv.org/abs/1803.04775>, 10 pages.
(Continued)

*Primary Examiner* — Ayodeji O Ayotunde
(74) *Attorney, Agent, or Firm* — Hanley, Flight & Zimmerman, LLC

(57) ABSTRACT

Apparatus and methods for extraction and calculation of multi-person performance metrics in a three-dimensional space. An example apparatus includes a detector to identify a first subject in a first image captured by a first image capture device based on a first set of two-dimensional kinematic keypoints in the first image, the two-dimensional kinematic keypoints corresponding to a joint of the first subject, the first image capture device associated with a first view of the first subject, a multi-view associator to verify the first subject using the first image and a second image captured by a second image capture device, the second image capture device associated with a second view of the first subject, the second view different than the first view,
(Continued)

and a keypoint generator to generate three-dimensional keypoints for the first subject using the first set of two-dimensional kinematic keypoints.

28 Claims, 26 Drawing Sheets

(51) Int. Cl.
    *G06T 7/292*     (2017.01)
    *G06T 7/73*     (2017.01)
    *G06V 10/75*     (2022.01)
    *G06V 10/147*     (2022.01)
    *G06V 10/20*     (2022.01)
    *G06V 10/22*     (2022.01)
    *G06V 20/40*     (2022.01)
    *G06V 20/64*     (2022.01)

(52) U.S. Cl.
    CPC ............ *G06V 10/22* (2022.01); *G06V 10/255* (2022.01); *G06V 10/757* (2022.01); *G06V 20/42* (2022.01); *G06V 20/647* (2022.01); *G06V 40/23* (2022.01); *G06T 2207/20084* (2013.01); *G06T 2207/30196* (2013.01); *G06T 2207/30221* (2013.01)

(58) Field of Classification Search
    USPC ......................................................... 382/103
    See application file for complete search history.

(56) References Cited

U.S. PATENT DOCUMENTS

| | | | |
|---|---|---|---|
| 10,176,405 | B1 | 1/2019 | Zhou et al. |
| 10,304,191 | B1 | 5/2019 | Mousavian et al. |
| 10,332,264 | B2 | 6/2019 | Schulter et al. |
| 10,402,983 | B2 | 9/2019 | Schulter et al. |
| 10,430,966 | B2 | 10/2019 | Varadarajan et al. |
| 10,733,441 | B2 | 8/2020 | Mousavian et al. |
| 10,853,970 | B1 * | 12/2020 | Akbas ................... G06T 1/0007 |
| 2015/0095360 | A1 | 4/2015 | Vrcelj et al. |
| 2016/0267331 | A1 | 9/2016 | Pillai et al. |
| 2018/0130215 | A1 | 5/2018 | Schulter et al. |
| 2018/0130216 | A1 | 5/2018 | Schulter et al. |
| 2018/0173969 | A1 | 6/2018 | Pillai et al. |
| 2019/0026917 | A1 | 1/2019 | Liao et al. |
| 2019/0066326 | A1 | 2/2019 | Tran et al. |
| 2019/0171909 | A1 | 6/2019 | Mandal et al. |
| 2019/0220992 | A1 | 7/2019 | Li et al. |
| 2019/0340432 | A1 | 11/2019 | Mousavian et al. |
| 2020/0074678 | A1 | 3/2020 | Ning et al. |
| 2020/0160102 | A1 * | 5/2020 | Bruna .................... G06V 10/24 |
| 2020/0364454 | A1 | 11/2020 | Mousavian et al. |
| 2021/0112238 | A1 | 4/2021 | Bylicka et al. |
| 2021/0366146 | A1 * | 11/2021 | Khamis .................. G06T 11/00 |
| 2022/0343639 | A1 | 10/2022 | Li et al. |
| 2022/0351535 | A1 | 11/2022 | Tao et al. |

FOREIGN PATENT DOCUMENTS

| | | |
|---|---|---|
| CN | 108960036 | 12/2018 |
| CN | 108986197 | 12/2018 |
| CN | 109886090 | 6/2019 |
| CN | 109948587 | 6/2019 |
| CN | 110008913 | 7/2019 |
| CN | 110009722 | 7/2019 |
| CN | 110458940 | 11/2019 |
| CN | 110516670 | 11/2019 |
| WO | 2019025729 | 2/2019 |
| WO | 2021109118 A1 | 6/2021 |
| WO | 2021120157 A1 | 6/2021 |
| WO | 2021258386 A1 | 12/2021 |

OTHER PUBLICATIONS

Joo et al., "Panoptic Studio: A Massively Multiview System for Social Interaction Capture," Dec. 9, 2016, Retrieved from the Internet: <https://arxiv.org/abs/1612.03153> 14 pages.

Schwarcz et al., "3D Human Pose Estimation from Deep Multi-View 2D Pose," Feb. 7, 2019, Retrieved from the Internet: <https://arXiv:1902.02841v1> 6 pages.

Qiu et al., "Cross View Fusion for 3D Human Pose Estimation," Sep. 3, 2019, Retrieved from the Internet: <https://arxiv.org/abs/1909.01203> 10 pages.

Dong et al., "Fast and Robust Multi-Person 3D Pose Estimation from Multiple Views", Proceedings of the IEEE Conference on Computer Vision and Pattern Recognition, Retreived from the Internet: arXiv:1901.04111v1, Jan. 14, 2019, 10 pages.

Pavlakos et al., "Harvesting Multiple Views for Marker-less 3D Human Pose Annotations," Apr. 16, 2017, Retrieved from the Internet: <https://arxiv.org/abs/1704.04793> 10 pages.

Iskakov et al., "Learnable Triangulation of Human Pose," May 14, 2019, Retrieved from the Internet: <https://arXiv:1905.05754v1> 9 pages.

International Searching Authority, "International Search Report and Written Opinion," issued in connection with International Patent Application No. PCT/CN2020/098306, dated Mar. 25, 2021, 11 pages.

International Searching Authority, "International Search Report and Written Opinion," issued in connection with International Patent Application No. PCT/CN2019/123625, dated Sep. 9, 2020, 10 pages.

International Searching Authority, "International Search Report and Written Opinion," issued in connection with International Patent Application No. PCT/CN2019/126906, dated Sep. 23, 2020, 9 pages.

Wang et al., "Person Re-identification with Cascaded Pairwise Convolutions," Jun. 18-23, 2018, IEEE/CVF Conference on Computer Vision and Pattern Recognition, Retrieved from the Internet: <https://ieeexplore.IEEE.org/document/8578257>, 9 pages.

Zhong et al.,"Camera Style Adaptation for Person Re-identification", Proceedings of the IEEE Conference on Computer Vision and Pattern Recognition, Retrieved from the Internet: arXiv:1711.10295v2, Apr. 10, 2018, 10 pages.

International Searching Authority, "Written Opinion" issued in connection with Application No. PCT/US2021/050609, dated Dec. 28, 2021, 5 pages.

International Searching Authority, "International Search Report" issued in connection with Application No. PCT/US2021/050609, dated Dec. 28, 2021, 5 pages.

Intel, "2019 CES: Intel and Alibaba Team on New AI-Powered 3D Athlete Tracking Technology Aimed at the Olympic Games Tokyo 2020," Retrieved from the Internet: [https://newsroom.intel.com/news/intel-alibaba-team-ai-powered-3d-athlete-trackingtechnology-olympic-games-tokyo-2020/#gs.xy8m7c], Jan. 7, 2019, 4 pages.

Zheng et al., "Scalable Person Re-identification: A Benchmark," Computer Vision Foundation, 2015, 9 pages.

Hermans et al., "In Defense of the Triplet Loss for Person Re-Identification," arXiv:1703.07737v4 [cs.CV], Nov. 21, 2017, 17 pages.

Sun et al., "Beyond Part Models: Person Retrieval with Refined Part Pooling (and A Strong Convolutional Baseline)," arXiv:1711.09349v3 [cs.CV], Jan. 9, 2018, 10 pages.

Wang et al., "Learning Discriminative Features with Multiple Granularities for Person Re-Identification," arXiv:1804.01438v3 [cs.CV], Aug. 17, 2018, 9 pages.

Luo et al., "Bag of Tricks and A Strong Baseline for Deep Person Re-identification," arXiv:1903.07071v3 [cs.CV], Apr. 19, 2019, 9 pages.

Wojke et al., "Deep Cosine Metric Learning for Person Re-Identification," arXiv:1812.00442v1 [cs.CV], Dec. 2, 2018, 9 pages.

Zhong et al., "Random Erasing Data Augmentation," arXiv:1708.04896v2 [cs.CV], Nov. 16, 2017, 10 pages.

(56) References Cited

OTHER PUBLICATIONS

Schroff et al., "FaceNet: A unified Embedding for Face Recognition and Clustering," arXiv:1503.03832v3 [cs.CV], Jun. 17, 2015, 10 pages.
Zhang et al., "AlignedReID: Surpassing Human-Level Performance in Person Re-Identification," arXiv.1711.08184v2 [cs.CV], Jan. 31, 2018, 10 pages.
Felzenszwalb et al., "Object Detection with Discriminatively Trained Part Based Models," IEEE Trans on PAMI, 2010, 20 pages.
Zhang et al., "Part-based R-CNNs for Fine-grained Category Detection," arXiv:1407.3867v1 [cs.CV], Jul. 15, 2014, 16 pages.
Andriluka et al., "2D Human Pose Estimation: New Benchmark and State of the Art Analysis," Computer Vision Foundation, 2014, 8 pages.
Sun et al., "Deep High-Resolution Representation Learning for Human pose Estimation," arXiv:1902.09212v1 [cs.CV], Feb. 25, 2019, 12 pages.
Hu et al., "Squeeze-and-Excitation Networks," Computer Vision Foundation, 2018, 10 pages.
Zajdel et al., "Keeping Track of Humans: Have I Seen This Person Before?", May 2005, available at https://www.researchgate.net/publication/224625831_Keeping_Track_of_Humans_Have_I_Seen_This_Person_Before, 7 pages.
Intel, "Intel True View," https://www.intel.com/content/www/US/en/sports/technology/true-view.html, last accessed Feb. 24, 2023.

\* cited by examiner

US 11,715,213 B2

1

APPARATUS AND METHODS FOR DETERMINING MULTI-SUBJECT PERFORMANCE METRICS IN A THREE-DIMENSIONAL SPACE

FIELD OF THE DISCLOSURE

This disclosure relates generally to machine vision analysis, and, more particularly, to apparatus and methods for determining multi-subject performance metrics in a three-dimensional space.

BACKGROUND

Image data (e.g., video data) can be used to track a subject (e.g., an individual such as an athlete) captured in the image data over time for purposes of, for instance, surveillance, biomechanical analysis (e.g., gait analysis), and/or computer-based applications, such as creation of intelligent interactive environments. Subject-based tracking further provides for development of specific subject-based identifiers that can be used to identify and track multiple subject in image data.

BRIEF DESCRIPTION OF THE DRAWINGS

FIG. 7 is a flowchart representative of example machine readable instructions which may be executed to implement elements of the example performance metrics determiner of

2

Figure 3:
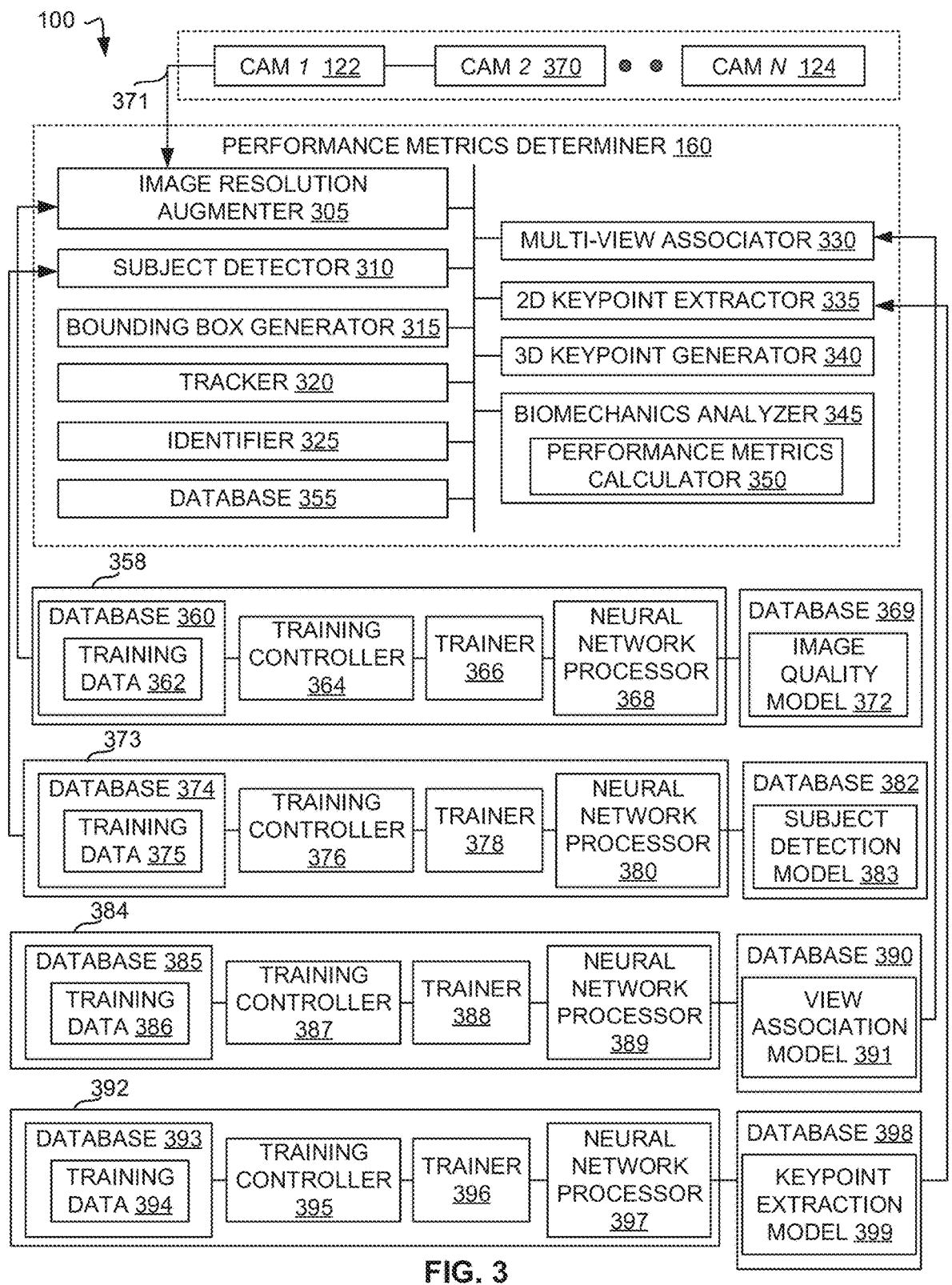
FIG. 3 is a block diagram of an example implementation of the performance metrics determiner of FIG. 1.

FIG. 3, the flowchart representative of instructions used to associate subject(s) across multiple image capture device views.

Figure 8:
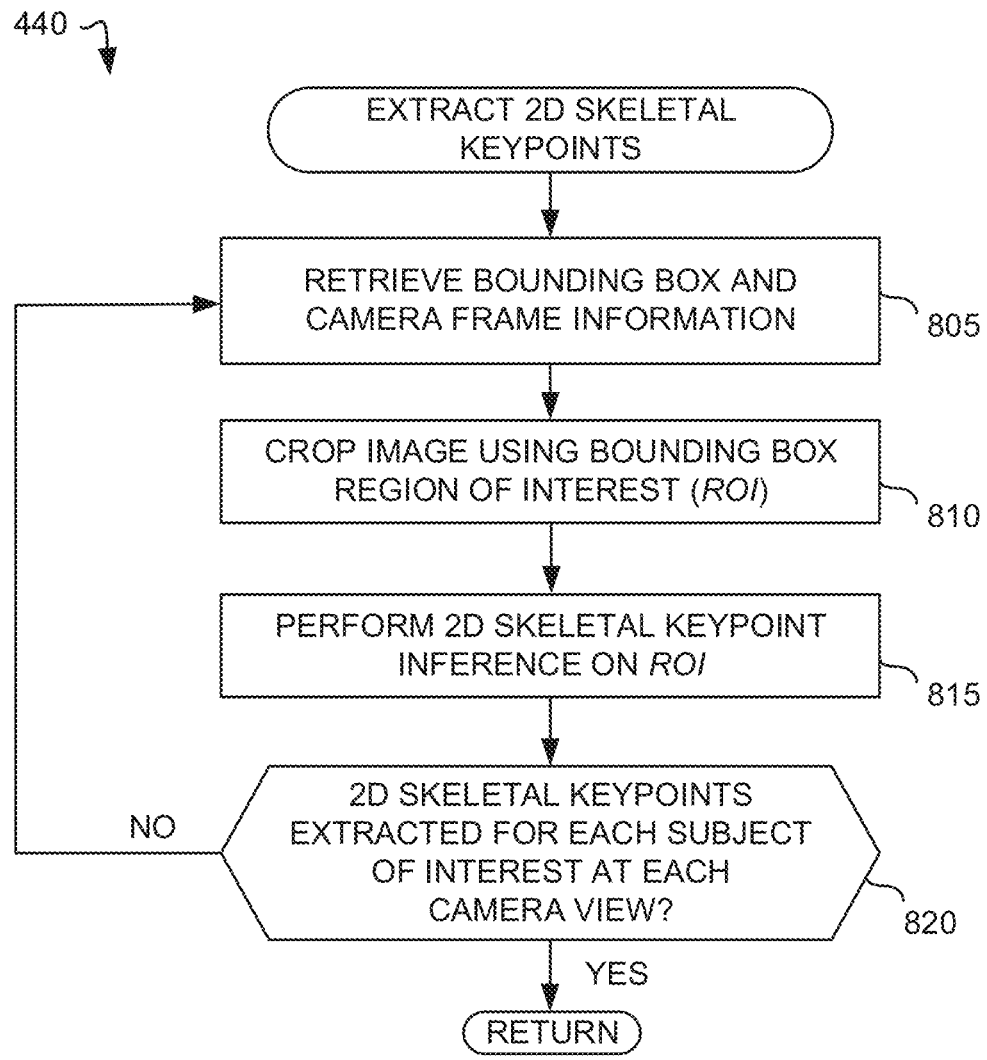

FIG. 8 is a flowchart representative of example machine readable instructions which may be executed to implement elements of the example performance metrics determiner of FIG. 3, the flowchart representative of instructions used to identify two-dimensional skeletal keypoints.

Figure 9:
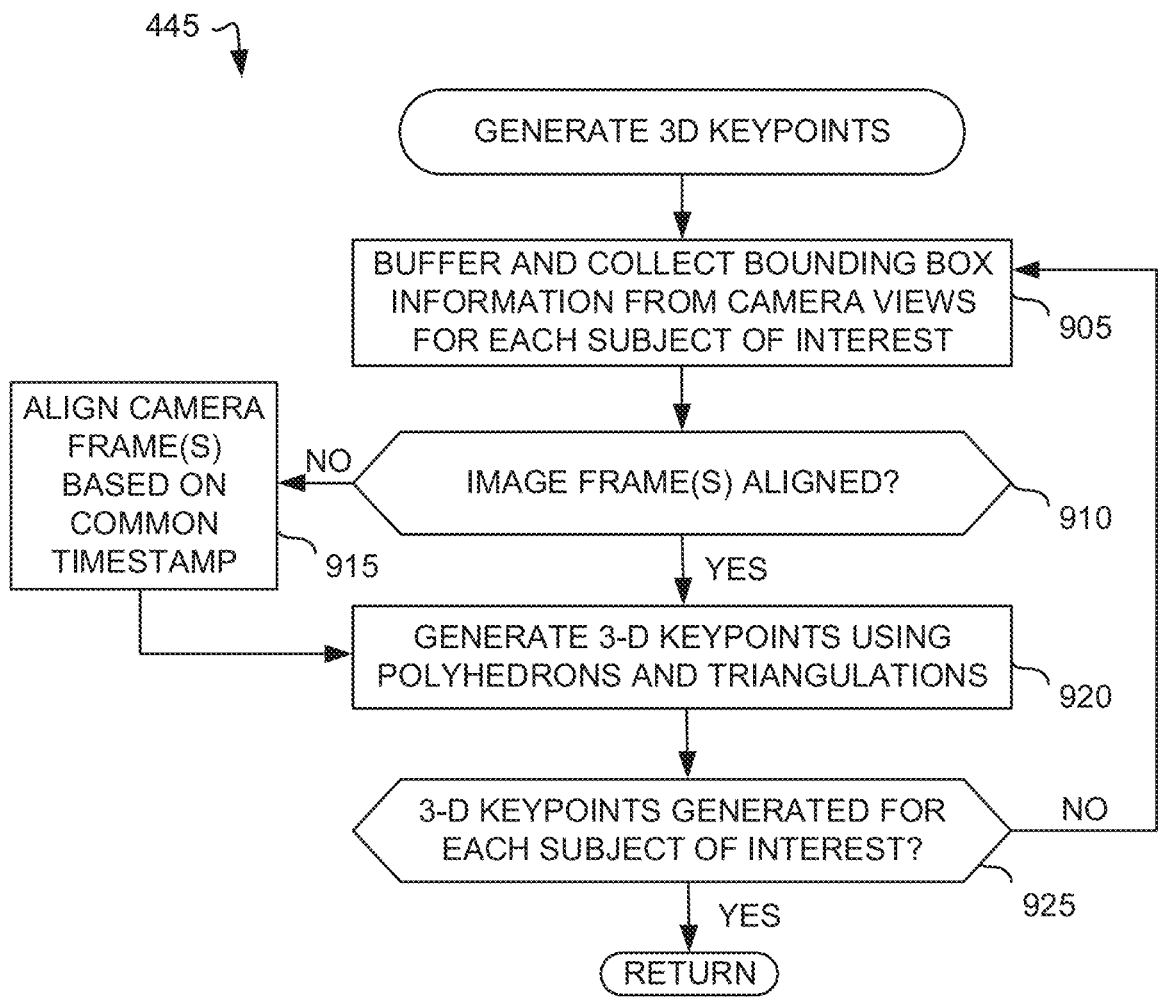

FIG. 9 is a flowchart representative of example machine readable instructions which may be executed to implement elements of the example performance metrics determiner of FIG. 3, the flowchart representative of instructions used to generate three-dimensional keypoints.

Figure 10:
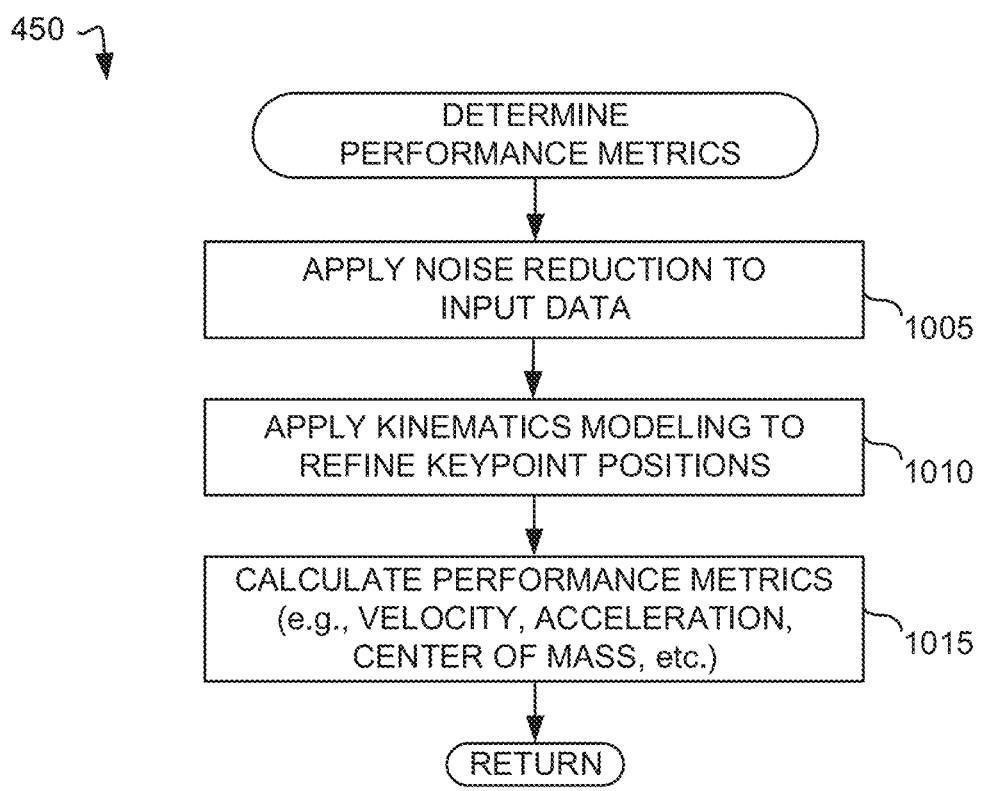

FIG. 10 is a flowchart representative of example machine readable instructions which may be executed to implement elements of the example performance metrics determiner of FIG. 3, the flowchart representative of instructions used to determine performance metrics.

Figure 1:
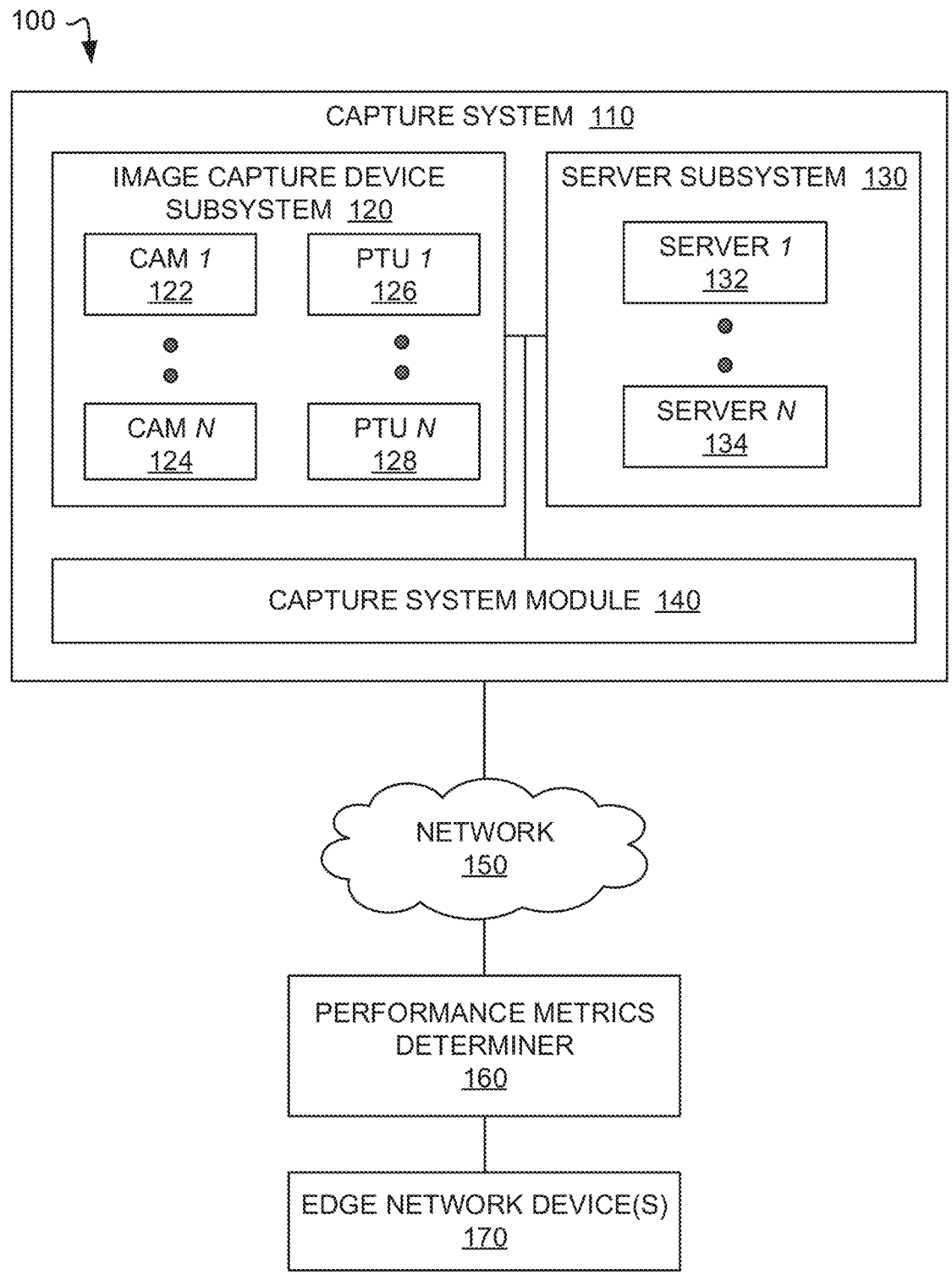
FIG. 1 illustrates an example system constructed in accordance with teachings of this disclosure and including an example capture system and an example performance metrics determiner to determine multi-subject performance metrics in a three-dimensional space.
Figure 11A:
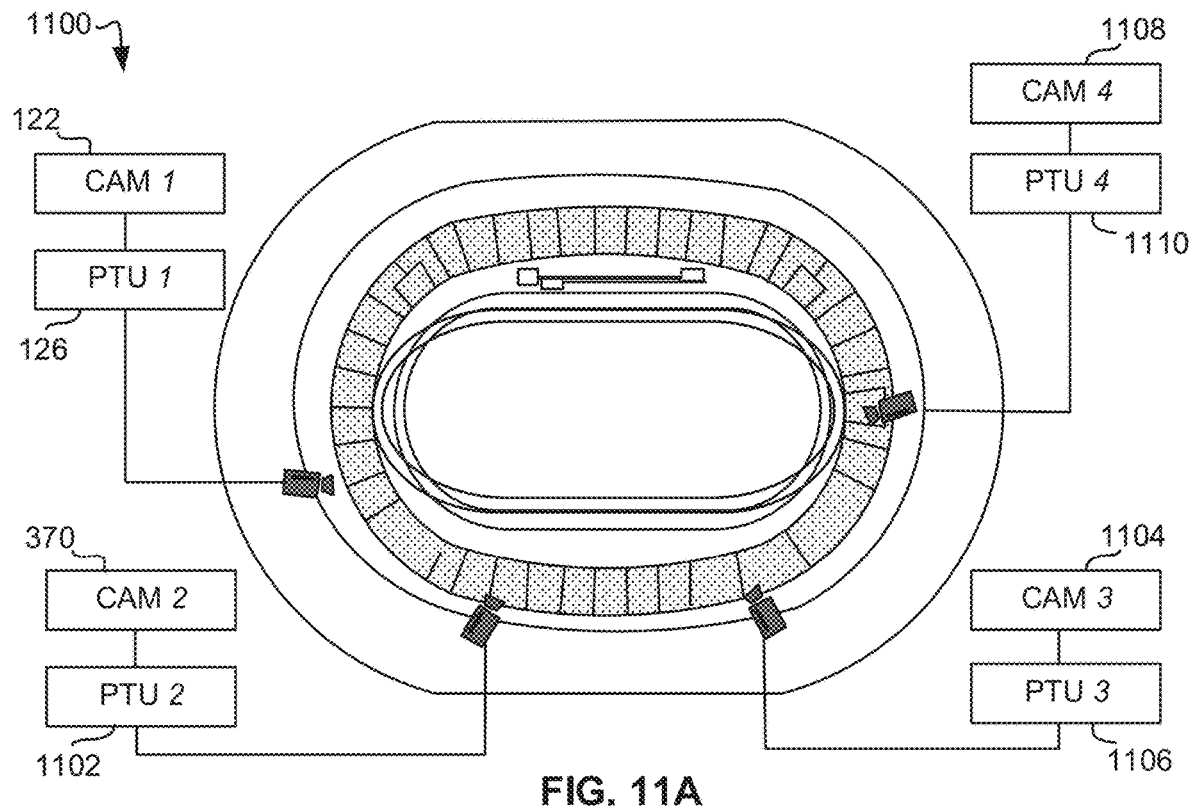

FIG. 11A illustrates example positioning of one or more image capture devices that may be implemented by the example capture system of FIG. 1.

Figure 11B:
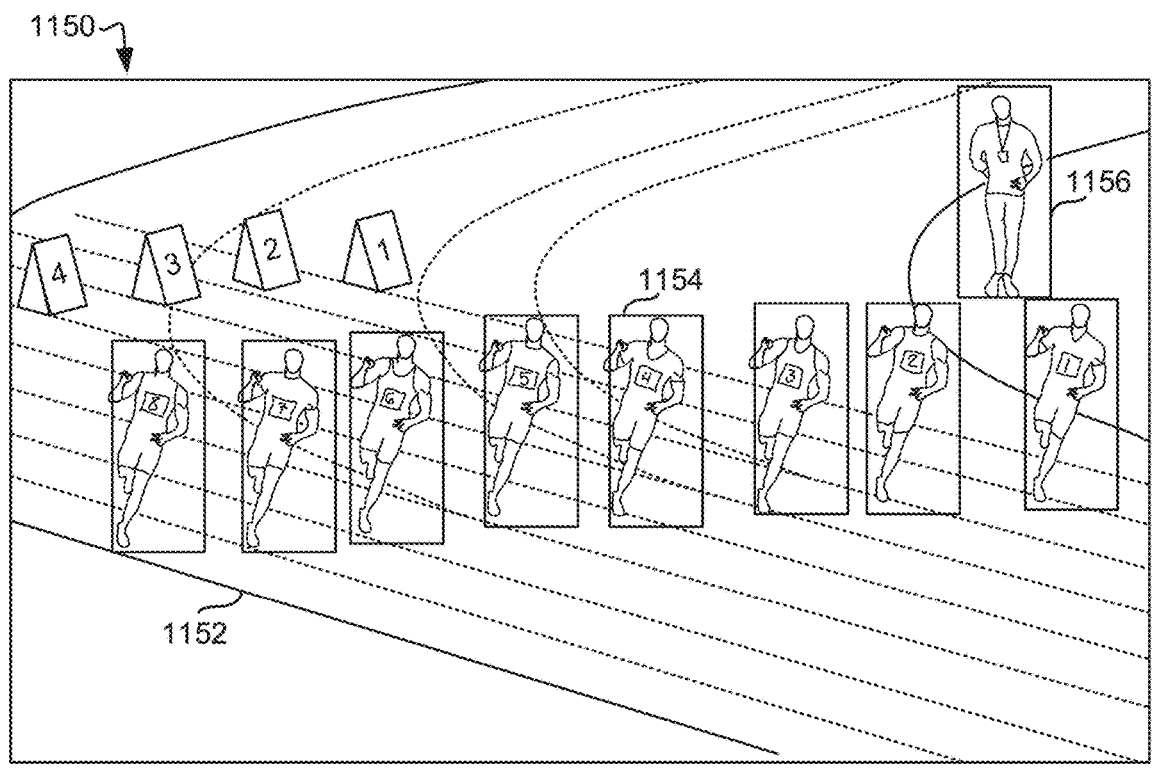

FIG. 11B illustrates example bounding boxes generated for subjects in a given view of an image capture device in accordance with teachings of this disclosure.

Figure 12A:
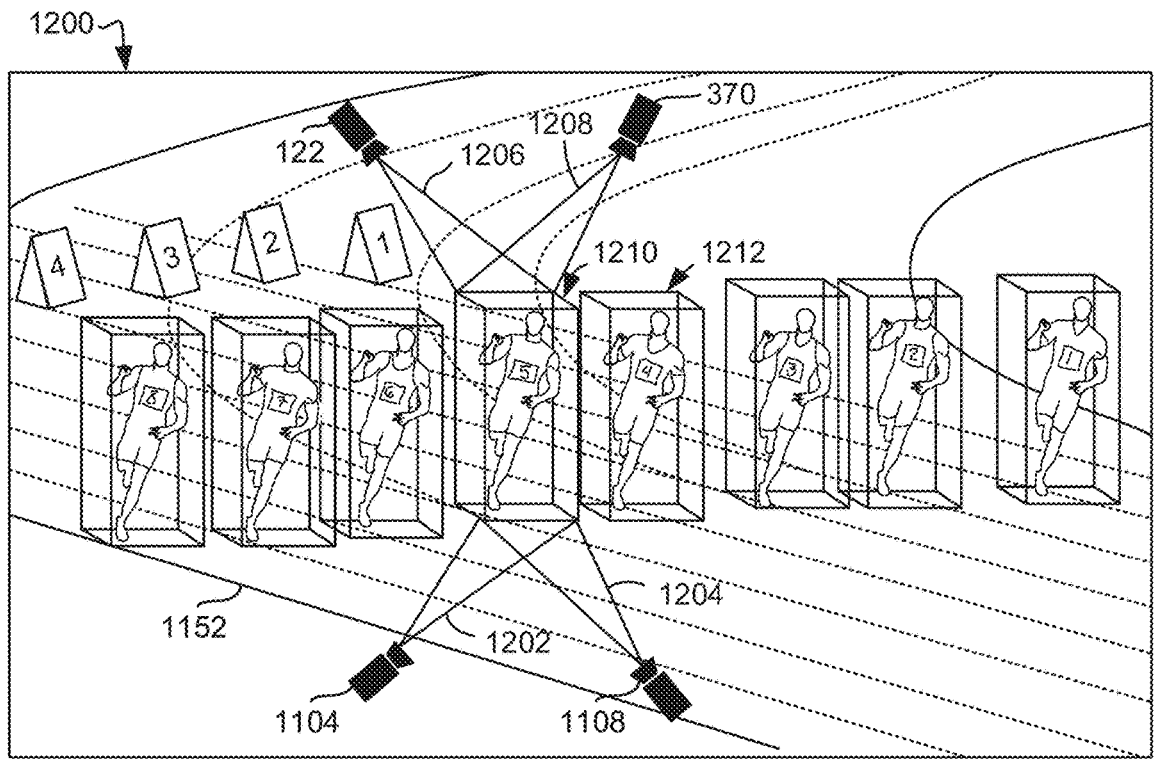

FIG. 12A illustrates example three-dimensional bounding boxes generated for subjects in image data in accordance with teachings of this disclosure.

Figure 12B:
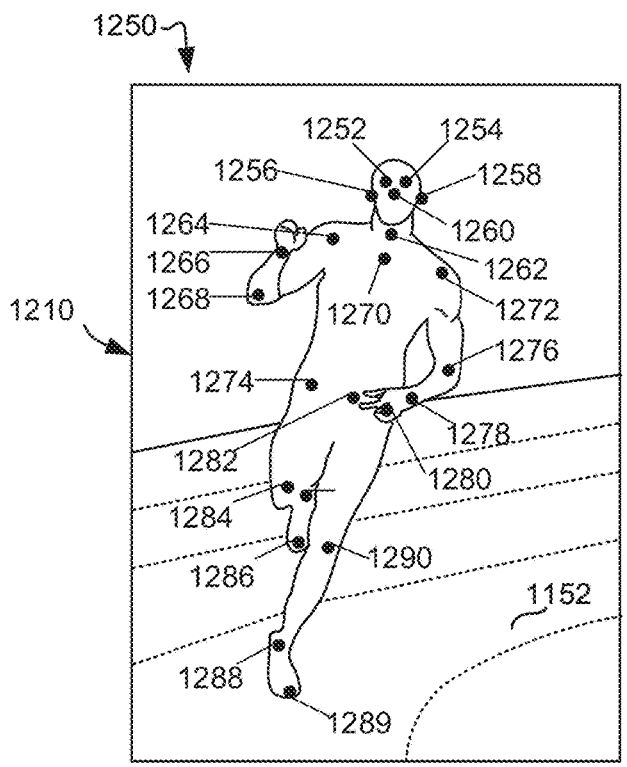
Figure 12C:
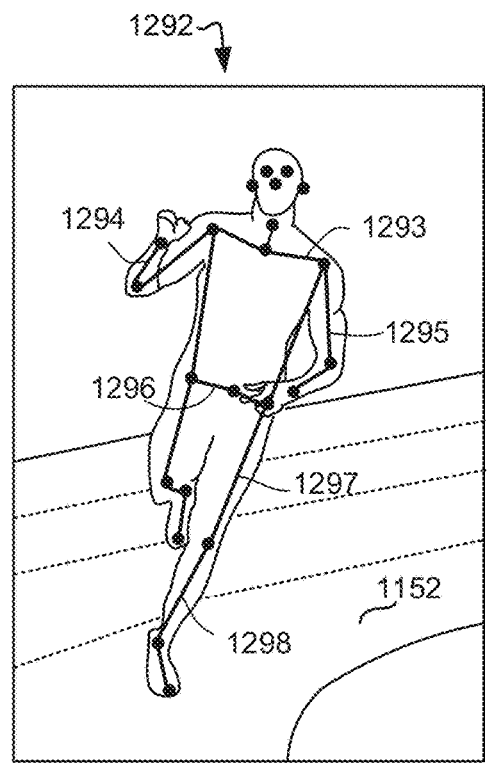

FIGS. 12B and 12C illustrate example graphical models showing identification of keypoints of a subject in accordance with teachings of this disclosure.

Figure 2:
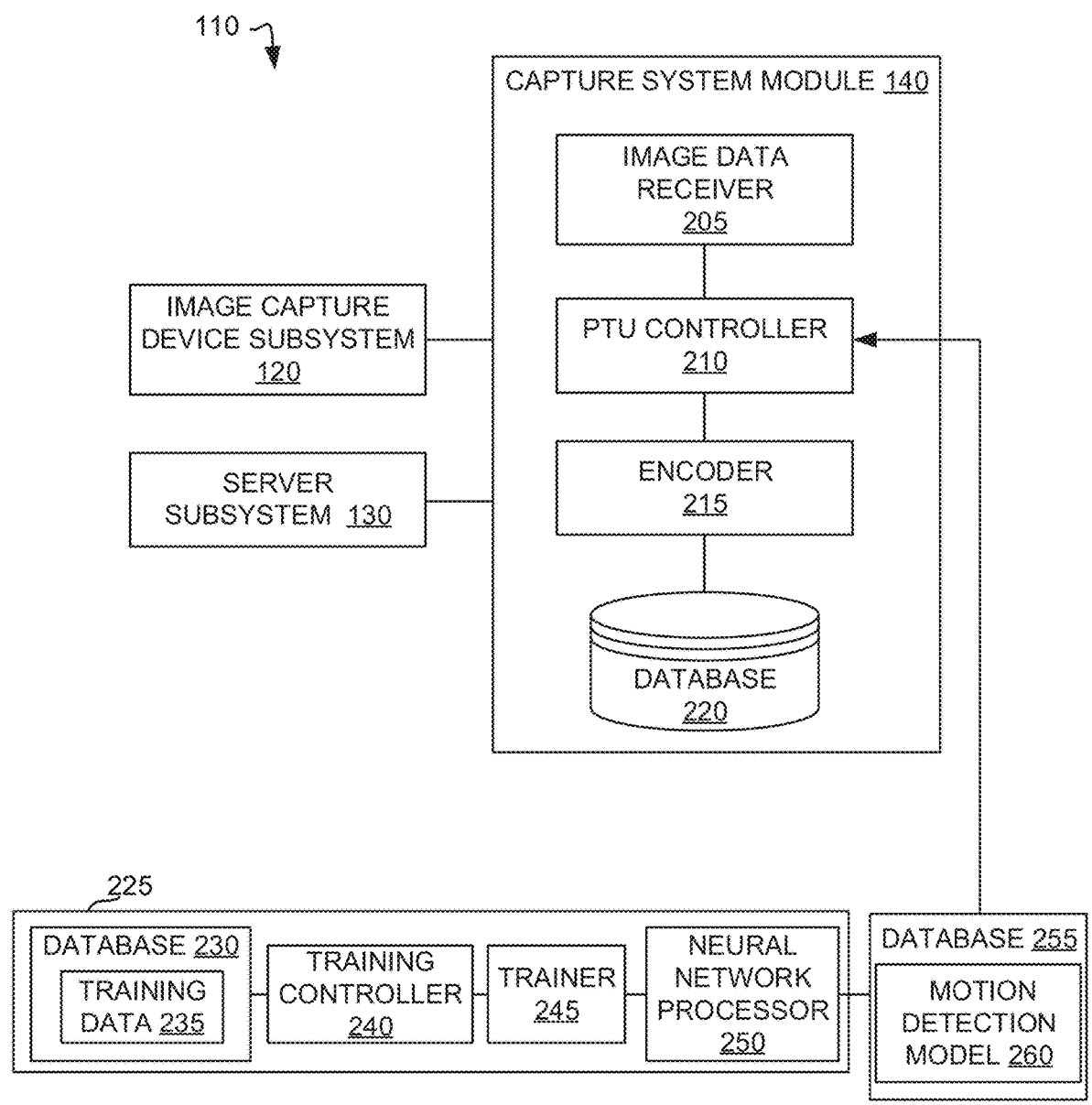
FIG. 2 illustrates the example capture system of FIG. 1, including an example capture system module constructed in accordance with teachings of this disclosure.
Figure 13A:
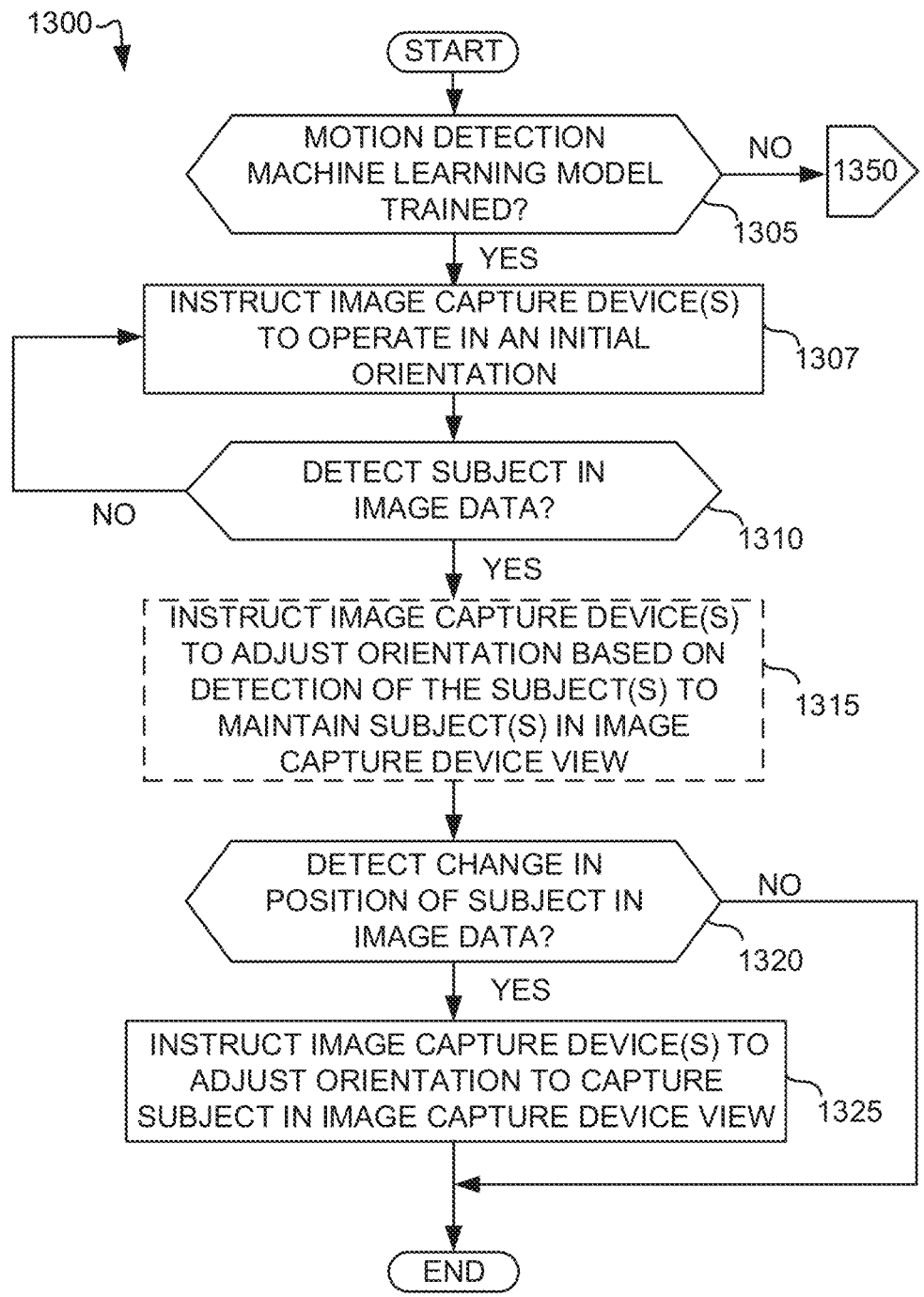

FIG. 13A is a flowchart representative of example machine readable instructions which may be executed to implement the example capture system module of FIG. 2.

Figure 13B:
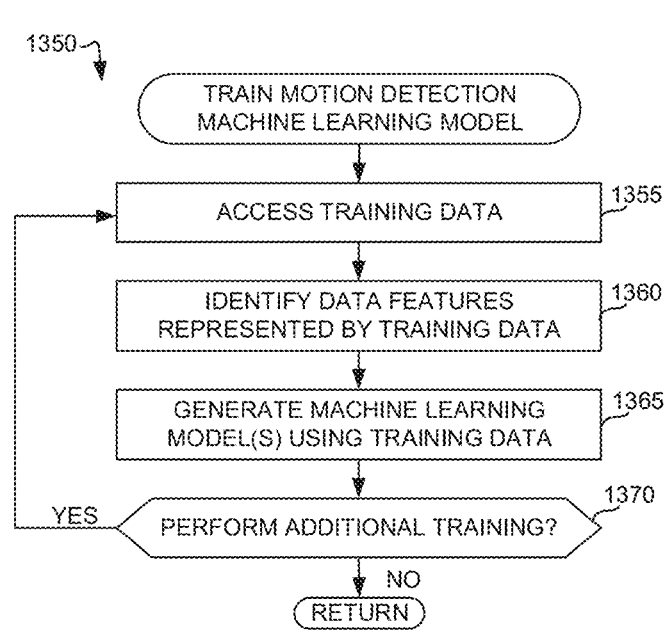

FIG. 13B is a flowchart representative of example machine readable instructions which, when executed by a computing system of FIG. 2, cause the computing system to train a neural network to perform motion detection.

Figure 14:
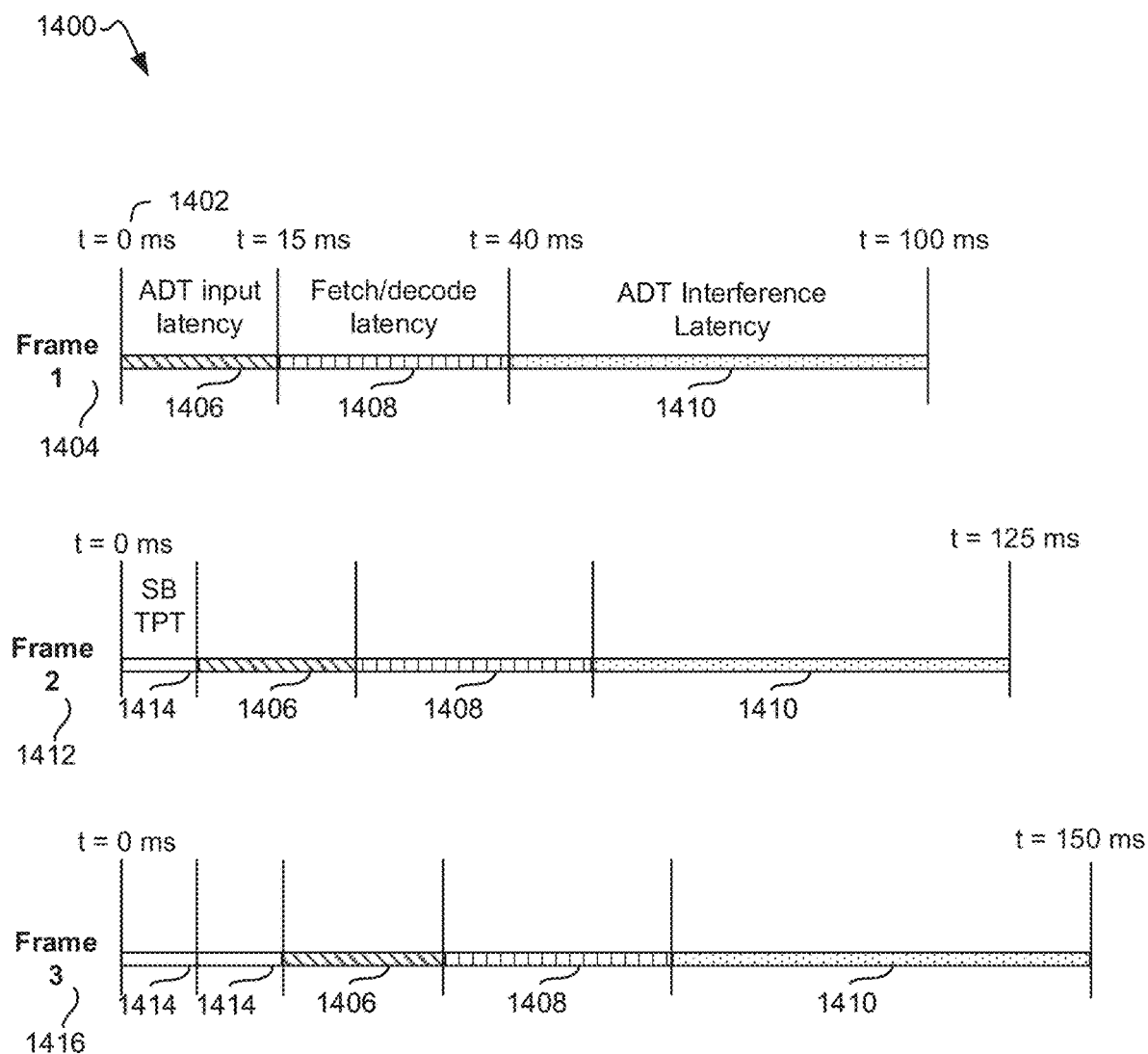

FIG. 14 illustrates example latency scaling for scaling and parallelization of multiple cloud nodes in connection with the example capture system, performance metric determiner, and edge network device(s) of FIG. 1.

Figure 15:
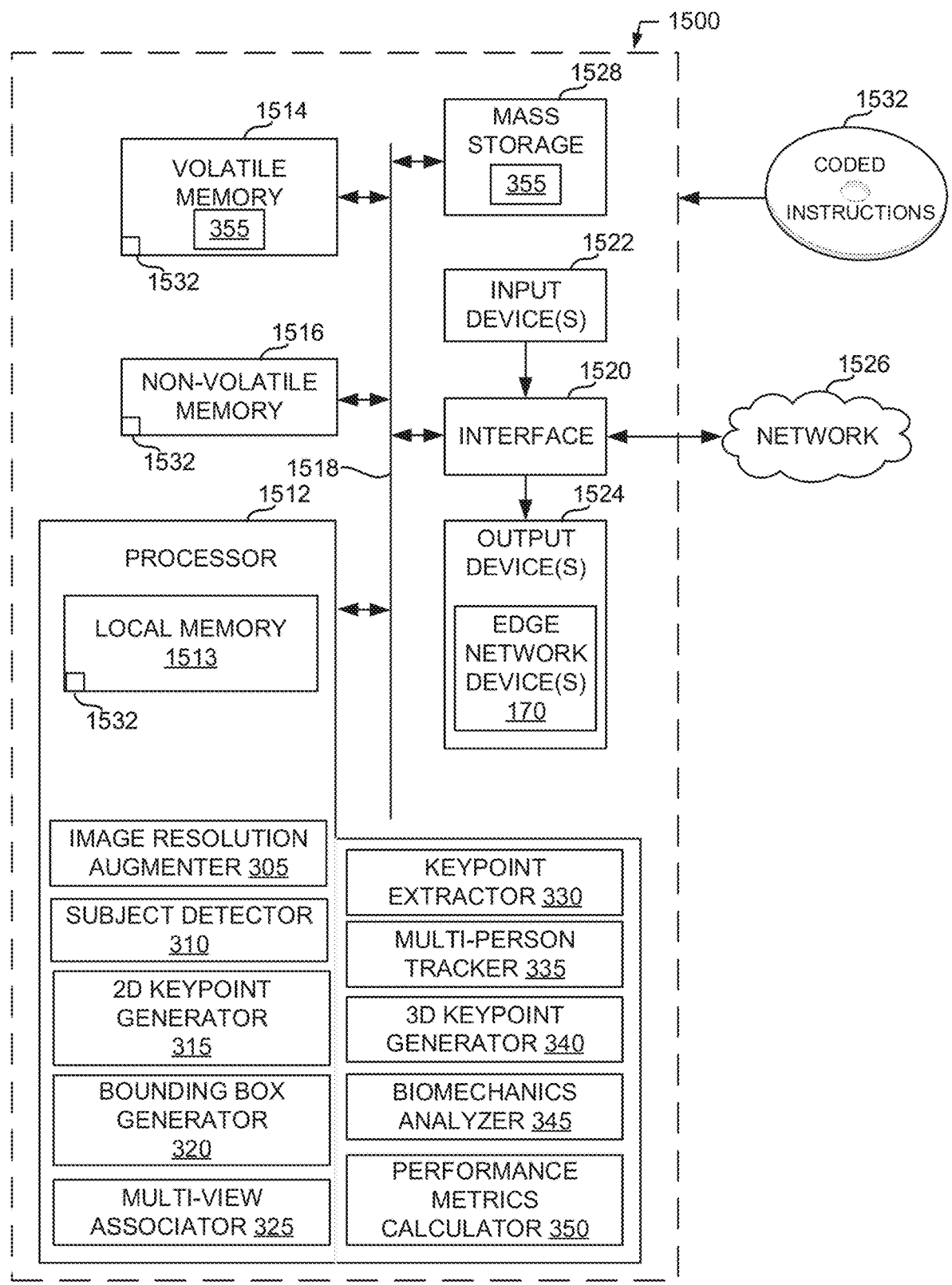

FIG. 15 is a block diagram of an example processing platform structured to execute the instructions of FIGS. 4, 6, 7, 8, 9, and/or 10 to implement the example performance metric determiner of FIGS. 1 and/or 3.

Figure 5A:
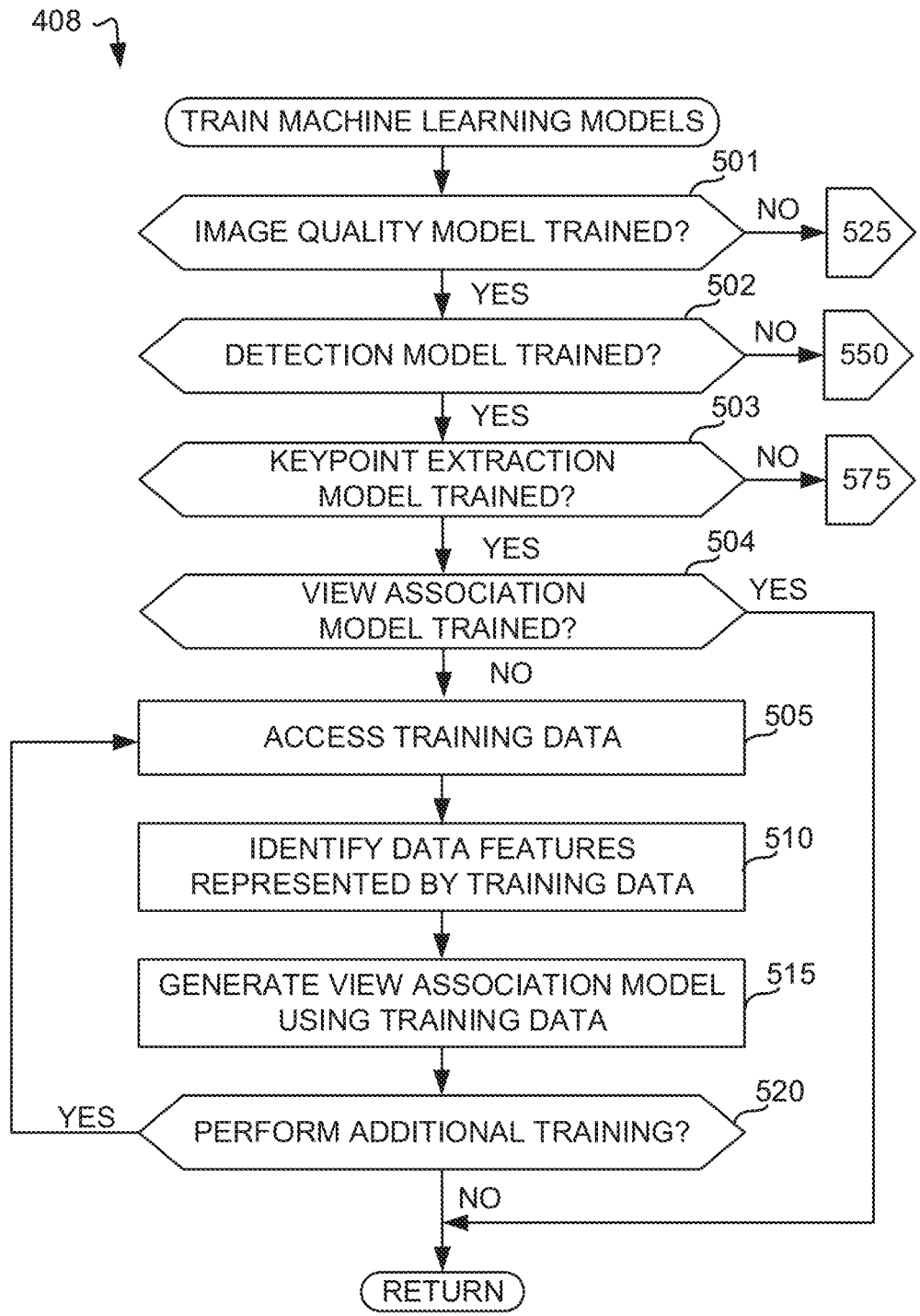
FIG. 5A is a flowchart representative of example machine readable instructions which, when executed by a computing system of FIG. 3, cause the computing system to train a neural network to perform multi-view association of subject(s) in images.
Figure 16:
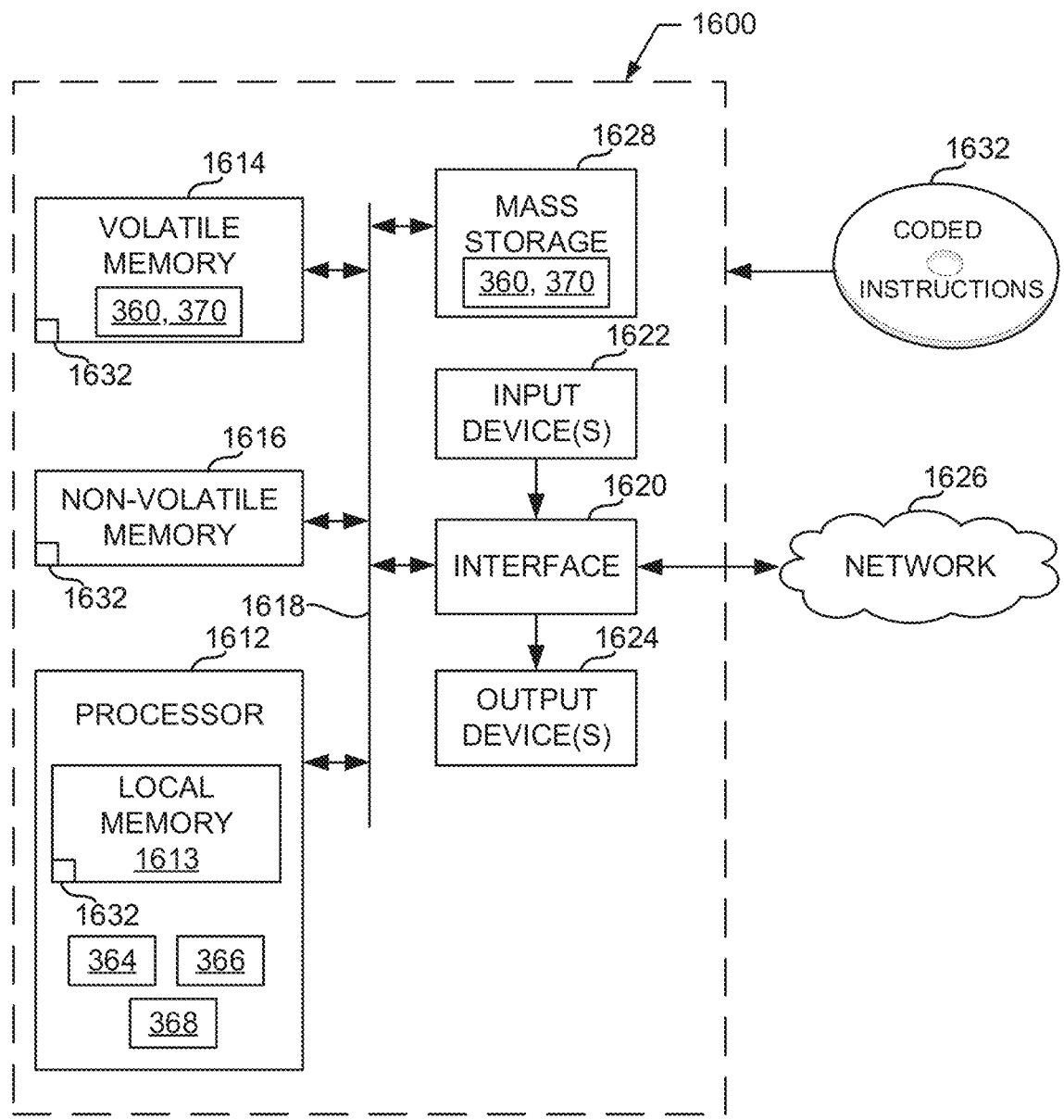

FIG. 16 is a block diagram of an example processing platform structured to execute the instructions of FIG. 5A to implement the example first computing system of FIG. 3.

Figure 5B:
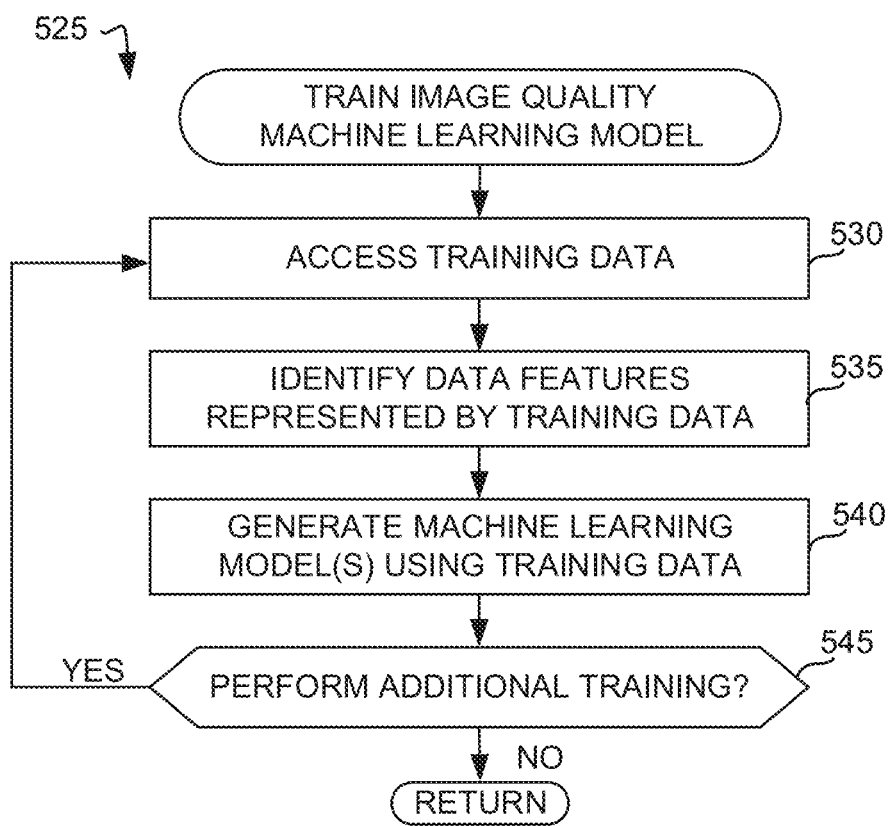
FIG. 5B is a flowchart representative of example machine readable instructions which, when executed by another computing system of FIG. 3, cause the computing system to train a neural network to assess image quality.
Figure 17:
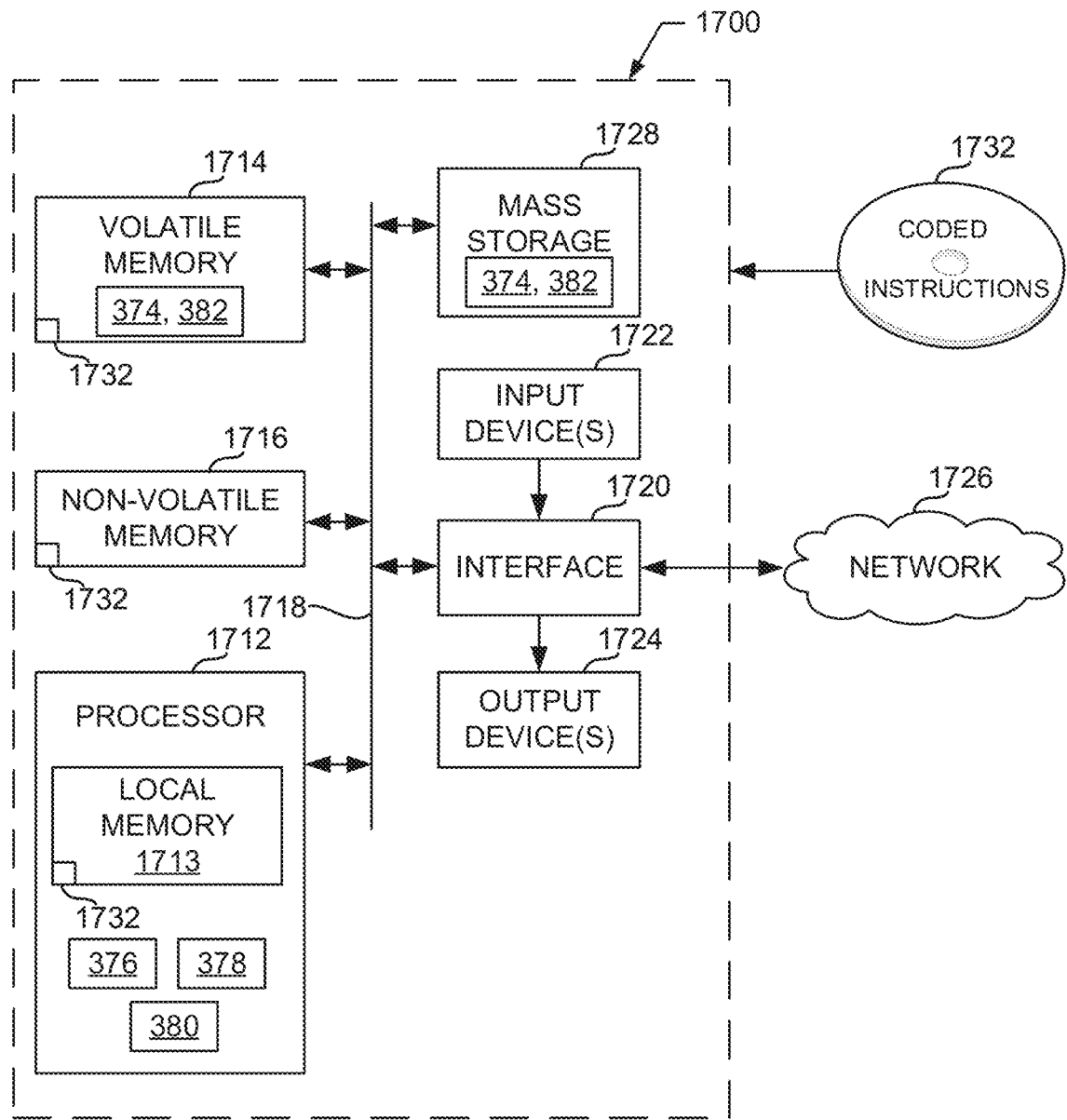

FIG. 17 is a block diagram of an example processing platform structured to execute the instructions of FIG. 5B to implement the example second computing system of FIG. 3.

Figure 5C:
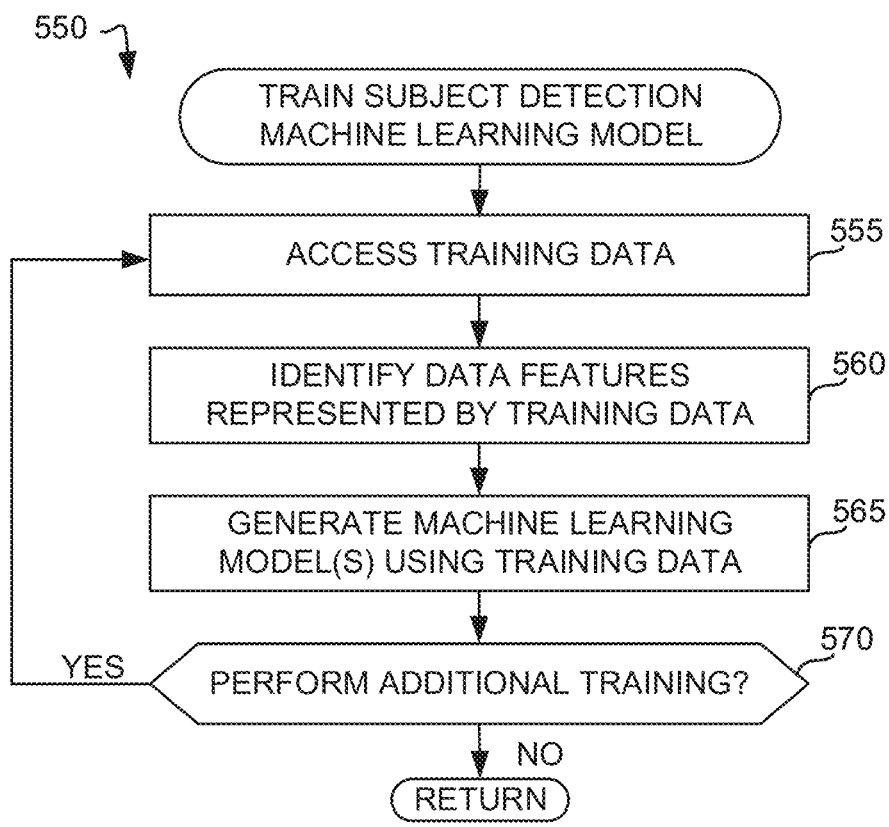
FIG. 5C is a flowchart representative of example machine readable instructions which, when executed by another computing system of FIG. 3, cause the computing system to train a neural network to perform subject detection.
Figure 18:
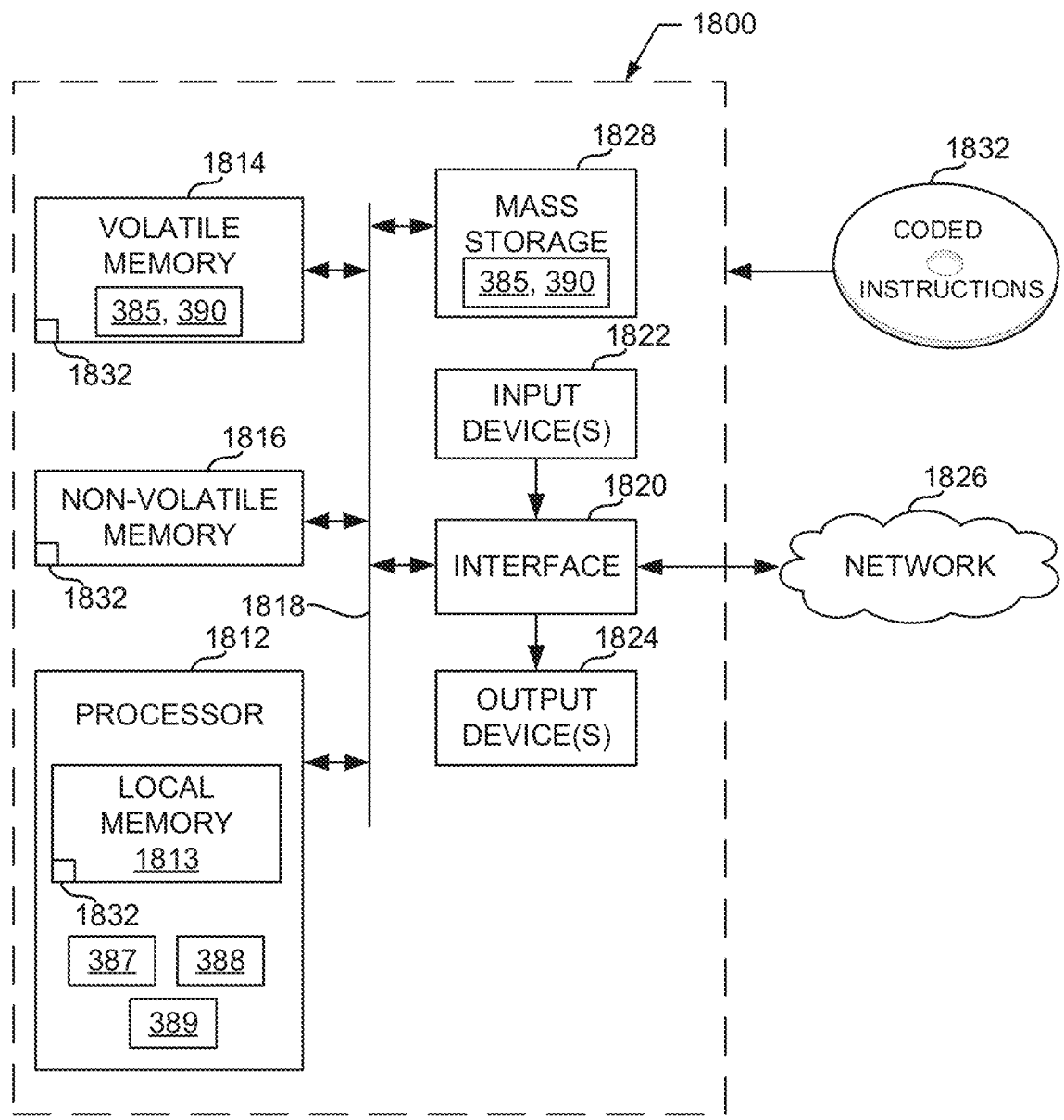

FIG. 18 is a block diagram of an example processing platform structured to execute the instructions of FIG. 5C to implement the example third computing system of FIG. 3.

Figure 5D:
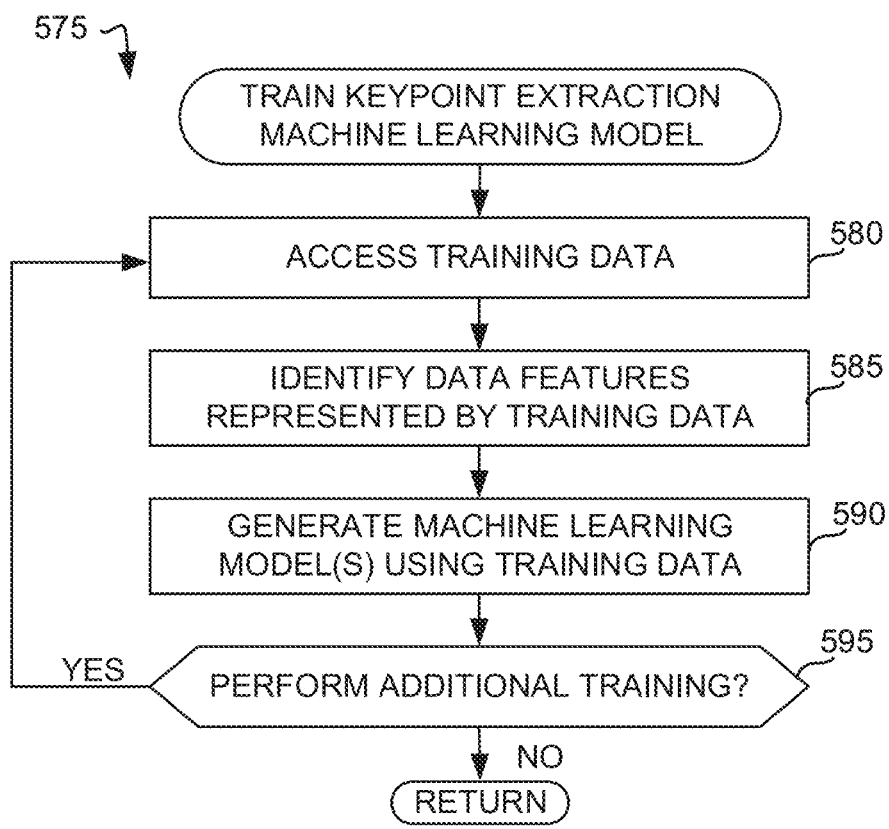
FIG. 5D is a flowchart representative of example machine readable instructions which, when executed by another computing system of FIG. 3, cause the computing system to train a neural network to perform keypoint extraction.
Figure 19:
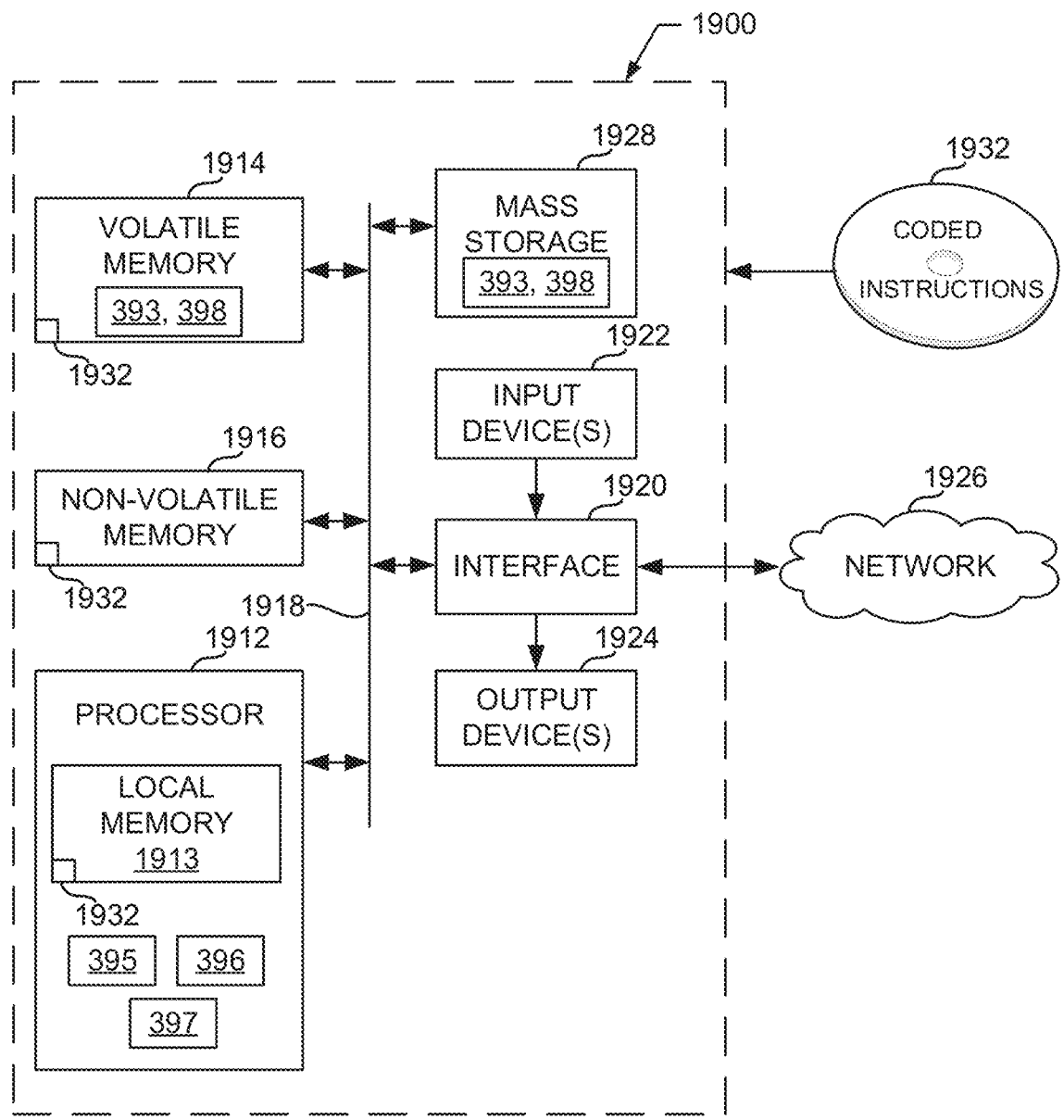

FIG. 19 is a block diagram of an example processing platform structured to execute the instructions of FIG. 5D to implement the example fourth computing system of FIG. 3.

Figure 20:
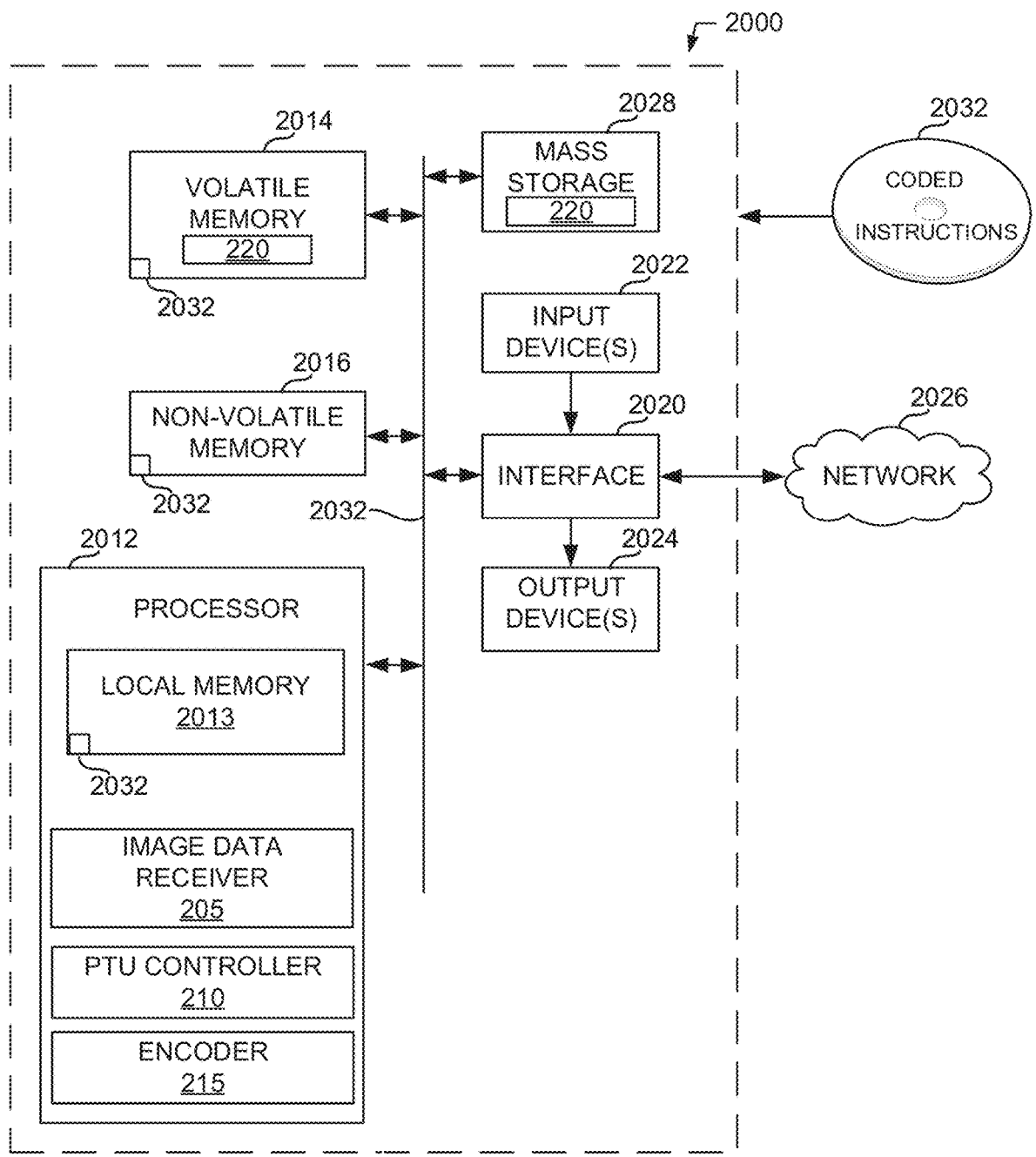

FIG. 20 is a block diagram of an example processing platform structured to implement the example camera system module 140 of FIGS. 1 and 2.

Figure 21:
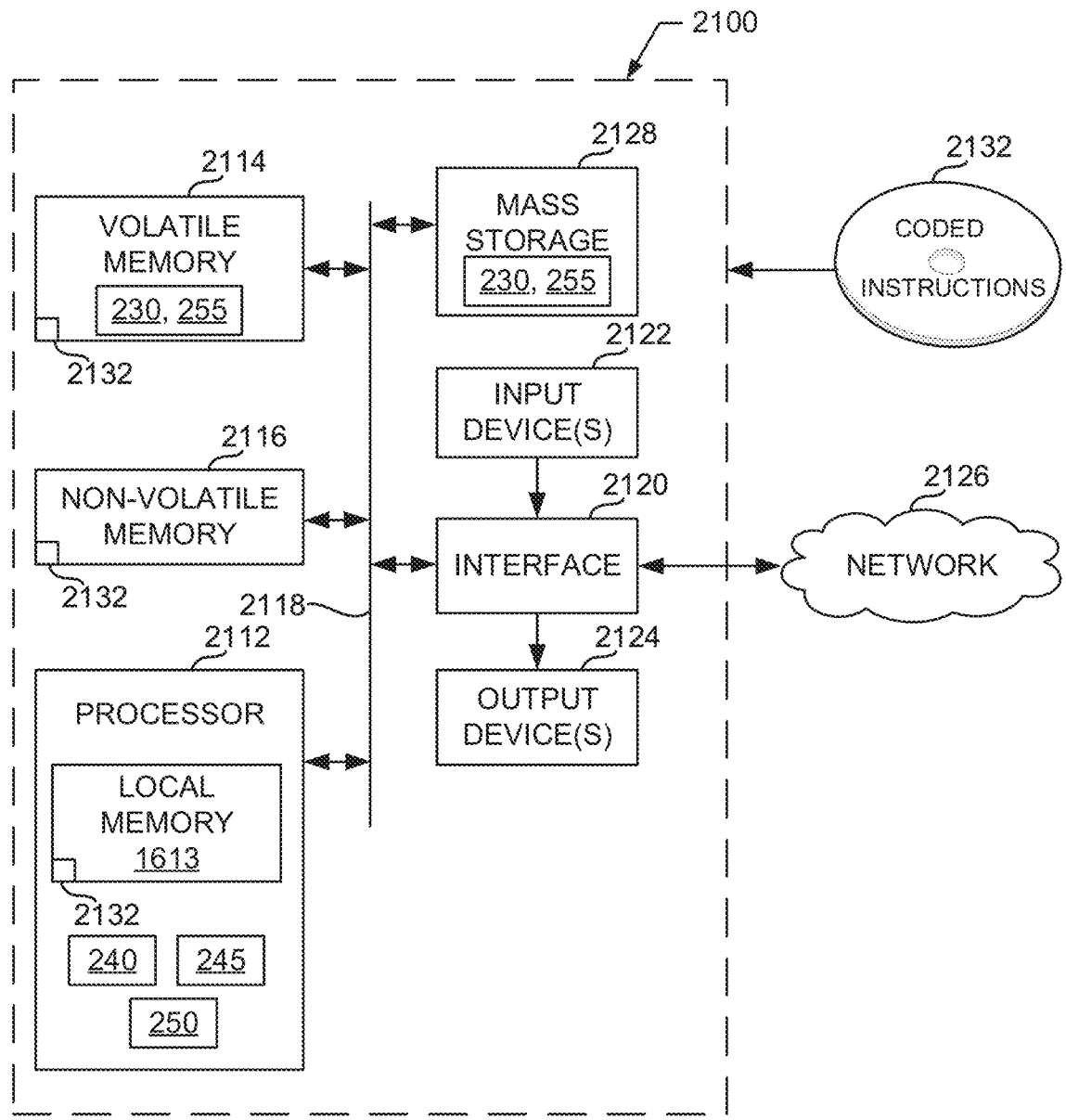

FIG. 21 is a block diagram of an example processing platform structured to execute the instructions of FIG. 13B to implement the example computing system of FIG. 2.

Figure 22:
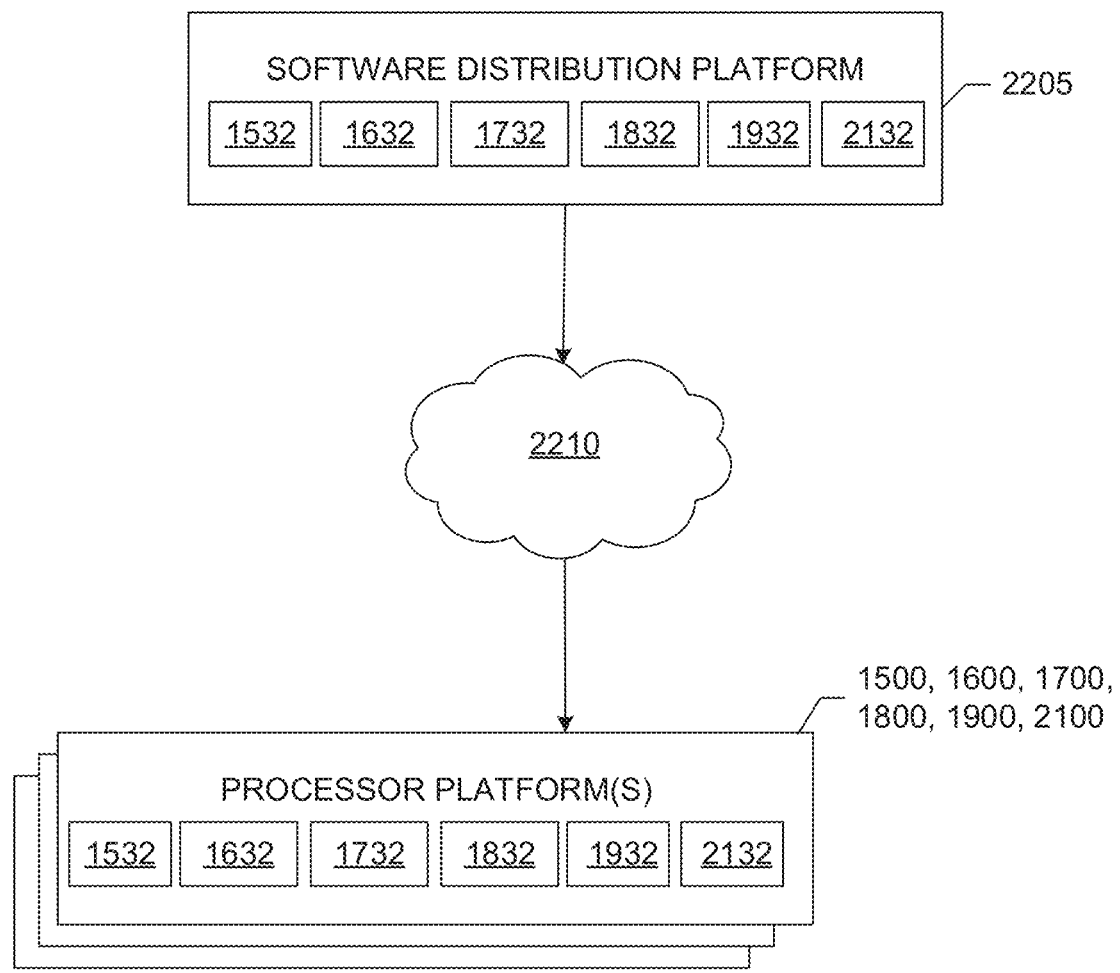

FIG. 22 is a block diagram of an example software distribution platform to distribute software (e.g., software corresponding to the example computer readable instructions of FIGS. 4, 5A, 5B, 5C, 5D, 6, 7, 8, 9, 10, 13A, and/or 13B) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

The figures are not to scale. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Multi-person tracking has applications in a range of different fields, including surveillance, entertainment, and athletics. Identification and tracking of multiple individuals in image data permits analysis of individual-based movements. Detection of subject-specific activities involves detection of movement of the subject and corresponding spatial features (e.g., type of physical activity, range of motion, interaction among individuals, etc.). However, some known methods for multi-person tracking rely on body-based sensors and vision systems that are prone to reduced accuracy as a result of increased latency and frequent occlusion of the subject (e.g., a tracked subject being hidden by another object or another subject). For example, sensor-based solutions are constrained to specialty suits, body sensors, and specific wiring and location requirements while vision-based solutions lack joint detection accuracy, have long latencies and do not support multi-person extraction due to occlusion. In addition, such systems may be developed and tailored to a specific movement pattern and/or sport.

Disclosed herein are methods and apparatus for extraction and calculation of multi-person performance metrics (e.g., metric(s) associated with an activity being performed by a subject, such as a velocity metric for a subject who is running) in a three-dimensional space using image data. Examples disclosed herein use a vision-based system to achieve multi-person performance metric extraction for delivery to any edge device on an end-to-end platform. In the examples disclosed herein, image data streams corresponding to multiple views (e.g., from a one or more image capture devices) are obtained. Examples disclosed herein use neural networks to provide an accurate and ultra-low latency network that can support real-time processing of image data for multi-subject tracking through parallel processing of multiple image data streams.

In the examples disclosed herein, the image data streams for each camera view are input into a detector and tracker module to assign and maintain a set of unique identifiers for each subject of interest (e.g., an athlete). The detector and tracker module results are provided to a multi-view association-based neural network to associate each image device capture view with the given subject of interest. Outputs generated by the multi-view association-based neural network can be fed to a two-dimensional skeletal neural network and a three-dimensional triangulation module to obtain three-dimensional joint mappings representing the positions of the subject joints in a three-dimensional space. The three-dimensional can be used to determine multi-performance metrics (e.g., biomechanical analysis) in substantially real-time. As such, the examples disclosed herein allow for use of computer vision-based neural networks to detect and extract joint keypoints used in the evaluation of performance metrics during multi-person events that introduce high occlusion frequencies.

Examples disclosed herein can be used during, for example, sporting events with multiple athletes requiring athlete-specific performance metric identification based on highly-accurate joint detection (e.g., velocity, stride length, shoulder sway, power angle, etc.). Furthermore, the examples disclosed herein permit the identification and filtering of both subjects of interest (e.g., athletes) and non-interest (e.g., referees) captured using the multiple camera views. Thus, examples disclosed herein can be implemented in applications involving large numbers of people to provide accurate subject tracking and performance evaluation.

FIG. 1 illustrates an example system 100 constructed in accordance with teachings of this disclosure and including an example capture system 110 to generate image data and an example performance metrics determiner 160 to determine multi-subject performance metrics in a three-dimensional space (e.g., a sporting stadium) based on the image data. In addition to the capture system 100 and the performance metrics determiner 160, the example system 100 of FIG. 1 includes an example network 150 and example edge network device(s) 170 (e.g., user devices(s) such as smartphone(s), personal computing device(s) (e.g., laptop(s)), etc.).

The example capture system 110 includes an image capture device subsystem 120, a server subsystem 130, and a capture system module 140. The capture system 110 is constructed to capture a pose of subject(s) (e.g., a biological creature such as a human being) using one or more image capture devices (e.g., cameras) and to perform one or more processing operations on the image data (e.g., compressing the data) for further processing by the performance metrics determiner 160. The capture system 110 can capture the subject(s) over time and, thus, image data generated by the capture system 110 can be used to track movement of the subject(s). In the example of FIG. 1, the image data processed by the image capture system 110 is transmitted to the performance metrics determiner 160 for multi-subject tracking and performance evaluation using the image data.

For example, the image capture device subsystem 120 includes a plurality of image capture devices including a first image capture device 122 (e.g., CAM 1) within an array of image capture devices (e.g., a total of N image capture devices) that is competed by the last image capture device 124 in the array. The image capture devices(s) 122-124 can include, example, video cameras, still cameras, etc. The image capture devices 122-124 can be mounted on pan-tilt units (PTUs), such as an example first pan-tilt unit 126 (e.g., PTU 1) supporting the first image capture device 122 and an example last pan-tilt unit 128 (e.g., PTU N) supporting the last image capture device 124 in the array (e.g., CAM N). Use of the PTUs permits the camera system 110 to track individuals as the individuals move around, for example, a stadium in which the image capture device subsystem 120 is located. Two or more of the image capture devices 122, 124 can provide for different views of the stadium based on position and/or orientation of the image capture devices 122, 124. The image capture devices 122, 124 of the image capture device subsystem 120 are in communication with a server array of the server subsystem 130, which includes an example first server 132 (e.g., Server 1) and an example last server 134 (e.g., Server N).

The capture system module 140 of the example capture system 110 of FIG. 1 controls the image capture devices(s) 122, 124. In some examples, the capture system module 140 controls positions and/or orientation of one or more of the image capture devices based on tracking of subject(s) in an environment in which the example capture system 110 is located. In some examples, the tracking is performed by a user using a control device such as a joystick and the capture system module 140 responds to the control device input(s) to control PTU actuation and, thus, position(s) of the image capture device(s) 122-124. Additionally or alternatively, the capture system module 140 can provide for automatic subject tracking by implementing a subject detector neural network (e.g., a convolutional neural network, etc.) that identifies subjects of interest for tracking as disclosed below. For example, running formations can be tracked by tracking all runners, tracking a lead runner, tracking a middle runner or group of runners, etc.

In the example of FIG. 1, the server subsystem 130 coordinates control signals and dataflow of the image capture device subsystem 120 and the capture system module 140 and delivers image data streams and/or any other data associated with the image capture devices 122, 124 (e.g., camera speed, angle, etc.) from each of the image capture devices 122, 124 of the image capture device subsystem 120 to the performance metrics determiner 160 (e.g., a cloud-based pipeline) for processing via the network 150. In some examples, each of the image data streams are delivered to the performance metrics determiner 160 concurrently or substantially concurrently (e.g., with some period of time such as within 10 milliseconds of each other, within 1 seconds of each other). The network 150 may be implemented using any suitable wired and/or wireless network(s) including, for example, one or more data buses, one or more Local Area Networks (LANs), one or more wireless LANs, one or more cellular networks, the Internet, etc. In the examples disclosed herein, the network 150 permits collection and integration of acquired data into cloud computing (e.g., allowing performance metric determiner 160 to use cloud nodes for data processing).

As disclosed herein, the performance metrics determiner 160 identifies or extracts performance metrics for the respective subjects in the image data generated by the image capture devices 122, 124. The performance metrics determiner 160 receives the image data streams from each of the image capture devices 122, 124 in the image capture device subsystem 120. For example, the performance metrics determiner 160 can receive four streams corresponding to four image capture device views (e.g., CAM 1-CAM 4). The performance metrics determiner 160 can assign and maintain a set of unique identifiers for each subject of interest (e.g., an athlete) that is identified in each of the views.

The performance metrics determiner 160 analyzes the image data to obtain three-dimensional joint mapping of the respective subjects in the image data. One or more poses of each subject can be estimated from the three-dimensional joint mapping and used to determine multi-performance metrics for each subject such as velocity, stride length, shoulder sway, power angle, etc. As disclosed herein, the performance metrics determiner 160 detects joint keypoints (e.g., elbow, wrist, ankle) of the respective subjects to enable evaluation of performance metrics during multi-subject events that involve instances of occlusion or partial occlusion of the subject(s), such as sporting events. Using the neural networks and augmentation modules, the performance metrics determiner 160 produces a highly accurate and ultra-low latency network that can support real-time processing through parallelization of multiple camera streams. The example performance metrics determiner 160 can process the image data streams (e.g., identify subjects, associate subjects across multiple image capture device views, extract joint keypoints, etc.) in parallel, thereby reducing latency. For instance, in some examples, the performance metrics determiner 160 generates a separate cloud node for each subject of interest being tracked and each image capture device view to faciliate parallel processing.

The edge network device(s) 170 receive data input(s) from the performance metrics determiner 160. In some examples, the edge network device(s) 170 receive data from the performance metrics determiner in substantially real-time as the performance metrics determiner 160 processes data received from the capture system 110 (as used herein "substantially real time" refers to occurrence in a near instantaneous manner (e.g., within one second) recognizing there may be real world delays for computing time, transmission, etc.). In examples disclosed herein, the edge network device(s) 170 receive input(s) from the performance metrics determiner 160 via the network 150.

FIG. 2 illustrates the example capture system 110 of FIG. 1, including an example implementation of the capture system module 140 in accordance with teachings of this disclosure. The capture system module 140 includes an example image data receiver 205, an example PTU controller 210, an example encoder 215, and an example database 220.

The image data receiver 205 receives input(s) from the image capture device subsystem 120 (e.g., video streams received from the image capture devices 122, 124).

The PTU controller 210 provides for positioning of the pan tilt unit payload (e.g., the image capture devices 122, 124). As illustrated in FIG. 2, the PTU controller 210 is in communication with a first computing system 225 that trains a neural network. As disclosed herein, the PTU controller 210 implements a neural network model to control orientation of the image capture devices 122,124.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, deep neural network models are used. In general, machine learning models/architectures that are suitable to use in the example approaches disclosed herein will be based on supervised learning. However, other types of machine learning models could additionally or alternatively be used such as, for example, semi-supervised learning.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using training algorithms such as a stochastic gradient descent. However, any other training algorithm may additionally or alternatively be used. In examples disclosed herein, training can be performed based on early stopping principles in which training continues until the model(s) stop improving. In examples disclosed herein, training can be performed remotely or locally. In some examples, training may initially be performed remotely. Further training (e.g., retraining) may be performed locally based on data generated as a result of execution of the models. Training is performed using hyperparameters that control how the learning is performed (e.g., a learning rate, a number of layers to be used in the machine learning model, etc.). In examples disclosed herein, hyperparameters that control complexity of the model(s), performance, duration, and/or training procedure(s) are used. Such hyperparameters are selected by, for example, random searching and/or prior knowledge. In some examples re-training may be performed. Such re-training may be performed in response to new input datasets, drift in the model performance, and/or updates to model criteria and system specifications.

Training is performed using training data. In examples disclosed herein, the training data originates from previously generated images that include subject(s) in different 2D and/or 3D pose(s), image data with different resolutions, images with different numbers of subjects captured therein, etc. Because supervised training is used, the training data is labeled. In example disclosed herein, labeling is applied to training data based on, for example, the number of subjects in the image data, the locations of the joint keypoints (e.g., ankles, wrist, elbow) of the respective subjects, etc. In some examples, the training data is sub-divided such that a portion of the data is used for validation purposes.

Once training is complete, the model(s) are stored in one or more databases (e.g., database 255 of FIG. 2 and/or databases 369, 382, 390, 399 of FIG. 3). One or more of the models may then be executed by, for example, the capture system module 140 and/or the performance metrics determiner 160, as disclosed below in connection with FIGS. 2 and 3.

Once trained, the deployed model(s) may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model(s) may be captured and provided as feedback. By analyzing the feedback, an accuracy of the deployed model(s) can be determined. If the feedback indicates that the accuracy of the deployed model(s) is less than a threshold or other criterion, training of an updated model can be triggered using the feedback and an updated training data set, hyperparameters, etc., to generate an updated, deployed model(s).

As shown in FIG. 2, the example system 110 includes a first computing system 225 to train a neural network track movement of a subject in image data. The example computing system 225 includes a neural network processor 250. In examples disclosed herein, the neural network processor 250 implements a first neural network.

The example first computing system 225 of FIG. 2 includes a first neural network trainer 245. The example first neural network trainer 245 of FIG. 2 performs training of the neural network implemented by the first neural network processor 250. In some examples disclosed herein, training is performed using a stochastic gradient descent algorithm. However, other approaches to training a neural network may additionally or alternatively be used.

The example first computing system 225 of FIG. 2 includes a first training controller 240. The example training controller 240 instructs the first neural network trainer 245 to perform training of the neural network based on first training data 235. In the example of FIG. 2, the first training data 235 used by the first neural network trainer 245 to train the neural network is stored in a database 230. The example database 230 of the illustrated example of FIG. 2 is implemented by any memory, storage device and/or storage disc for storing data such as, for example, flash memory, magnetic media, optical media, etc. Furthermore, the data stored in the example database 230 may be in any data format such as, for example, binary data, comma delimited data, tab delimited data, structured query language (SQL) structures, image data, etc. While the illustrated example database 230 is illustrated as a single element, the database 230 and/or any other data storage elements described herein may be implemented by any number and/or type(s) of memories.

In the example of FIG. 2, the training data 235 can include image data including subject(s) in different locations or positions in an environment captured in the image data relative to the view associated with an image capture device that generated the image data. The training data 235 can be labeled with coordinate positions of one or more portions of the subject(s) (e.g., skeletal keypoints) in the image data and/or other identifiers of the subject(s) (e.g., facial recognition features, bounding box detection, segmentation, path pattern). In some examples, the training data 235 is labeled with features of subjects of interest (e.g., image recognition) to identify, for example, a particular subject (e.g., a lead runner), a group of subject (e.g., a group of runner). In some examples, the training data includes the image data generated by the image capture devices(s) 122, 124. The first neural network trainer 245 trains the neural network implemented by the neural network processor 250 using the training data 235. Based on the different positions of the subject(s) in the training data 235, the first neural network trainer 245 trains the neural network to recognize subject(s) in the image data and to identify (e.g., predict) changes in position of the subject(s) in the image data relative to the image capture device view in response to movement the subject(s). Changes in the position of the subject(s) in the image data relative to the image capture device view can indicate whether the subject(s) are likely to leave the current field of view of a particular image capture device, thereby indicating that adjustment to the orientation of the image capture device is warranted.

A motion detection model 260 is generated as a result of the neural network training. The motion detection model 260 is stored in a database 255. The databases 230, 255 may be the same storage device or different storage devices.

The PTU controller 210 executes the motion detection model 260 to detect whether subject(s) are in the image data received from the image capture devices 122, 124 (e.g., based on recognition techniques such as facial recognition, bounding box detection, segmentation, skeletal keypoints, and/or path pattern). The PTU controller 210 executes the motion detection model 260 to analyze image data generated by the image capture devices 122, 124 over time to identify or predict whether the subject(s) have changed positions (i.e., moved) in the environment relative to the view associated with a particular image capture device 122, 124 and, thus, and is likely to leave a field of view of the image device 122, 124. For example, the PTU controller 210 can identify changes in the coordinate positions of one or more portion(s) of the subject(s) between frames of the image data feeds received from the image capture devices 122, 124. The PTU controller 210 can instruct the image capture devices 122, 124 to change orientation (e.g., lens angle, view, rotational angle, tilt position, etc.) in response to the changes in the position(s) of the subject(s) in the image data to enable the image capture devices to maintain the subject(s) in the field of view. Thus, the PTU controller 210 can be used to provide automatic subject detection and tracking of subject(s) in an environment based on image data. The PTU controller 210 controls the orientation of the image capture devices to enable the image capture devices 122, 124 to maintain the subject(s) within the field of view of the image capture devices 122, 124.

The encoder 215 of the example capture system module 140 encodes full frame streams (e.g., at speeds greater than 60 frames per second (fps)) which are accessible via the server subsystem 130. For example, the encoder 215 can compress video content (e.g., by performing image resizing, removal of redundant information from frame to frame, adjusting the number of frames per second, etc.) to faciliate streaming of the video content without interruption (e.g., avoiding buffering). In some examples, the encoder 215 evaluates content compatibility (e.g., conformation to encoding specifications).

The database 220 of FIG. 2 can be used to store any information associated with the image capture device subsystem 120, the server subsystem 130, and/or the capture system module 140. For example, the database 220 can maintain image data streams originating from the image capture device subsystem 120. In some examples, the database 220 can store encoded frames and/or compressed video content generated by the encoder 215. The example database 220 of the illustrated example of FIG. 2 is implemented by any memory, storage device and/or storage disc for storing data such as, for example, flash memory, magnetic media, optical media, etc. Furthermore, the data stored in the example database 220 may be in any data format such as, for example, binary data, comma delimited data, tab delimited data, structured query language (SQL) structures, image data, etc.

While an example manner of implementing the camera system module 140 is illustrated in FIGS. 1 and 2, one or more of the elements, processes and/or devices illustrated in FIGS. 1 and 2 may be combined, divided, re-arranged, omitted, eliminated and/or implemented in any other way. Further, the example camera image data receiver 205, the example PTU controller 210, the example encoder 215, the example database 220, and/or, more generally, the example camera system module 140 of FIGS. 1 and 2 may be implemented by hardware, software, firmware and/or any combination of hardware, software and/or firmware. Thus, for example, any of the example camera image data receiver 205, the example PTU controller 210, the example encoder 215, the example database 220, and/or, more generally, the example camera system module 140, could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example camera image data receiver 205, the example PTU controller 210, the example encoder 215, and/or the example database 220 is/are hereby expressly defined to include a non-transitory computer readable storage device or storage disk such as a memory, a digital versatile disk (DVD), a compact disk (CD), a Blu-ray disk, etc. including the software and/or firmware. Further still, the example camera system module 140 of FIGS. 1 and 2 may include one or more elements, processes and/or devices in addition to, or instead of, those illustrated in FIGS. 1 and 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the first computing system 225 is illustrated in FIG. 2, one or more of the elements, processes and/or devices illustrated in FIG. 3 may be combined, divided, re-arranged, omitted, eliminated and/or implemented in any other way. Further, the example neural network processor 250, the example trainer 245, the example training controller 240, the example database(s) 230, 255 and/or, more generally, the example first computing system 225 of FIG. 2 may be implemented by hardware, software, firmware and/or any combination of hardware, software and/or firmware. Thus, for example, any of the example neural network processor 250, the example trainer 245, the example training controller 240, the example database(s) 230, 255, and/or more generally the example first computing system 225 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example neural network processor 250, the example trainer 245, the example training controller 240, and/or the example database(s) 230, 255 is/are hereby expressly defined to include a non-transitory computer readable storage device or storage disk such as a memory, a digital versatile disk (DVD), a compact disk (CD), a Blu-ray disk, etc. including the software and/or firmware. Further still, the example first computing system 225 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the capture system module 140 of FIG. 2 is shown in FIG. 13A. A flowchart representative of example hardware logic, machine readable instructions, hardware implemented state machines, and/or any combination thereof for implementing the example first computing system 225 of FIG. 2 is shown in FIG. 13B. The machine readable instructions may be an executable program or portion of an executable program for execution by a computer processor such as the processor(s) 2012, 2112 shown in the example processor platform(s) 2000, 2100 discussed below in connection with FIGS. 20-21. The program(s) may be embodied in software stored on a non-transitory computer readable storage medium such as a CD-ROM, a floppy disk, a hard drive, a DVD, a Blu-ray disk, or a memory associated with the processor(s) 2012, 2112 but the entire program and/or parts thereof could alternatively be executed by a device other than the processor(s) 2012, 2112 and/or embodied in firmware or dedicated hardware.

FIG. 3 is a block diagram of an example implementation of the performance metrics determiner 160 of the example system 100 of FIG. 1. The performance metrics determiner 160 includes an example image resolution augmenter 305, an example subject detector 310, an example bounding box generator 315, an example tracker 320, an example identifier 325, an example multi-view associator 330, an example two-dimensional (2D) keypoint extractor 335, an example three-dimensional (3D) keypoint generator 340, an example biomechanics analyzer 345, an example performance metrics calculator 350, and an example database 355. As illustrated in FIG. 3, the performance metrics determiner 160 is in communication with computing systems 358, 373, 384 that train neural networks. As disclosed herein, the performance metric determiner 160 implements neural network models generated as a result of the training.

As disclosed herein, the performance metrics determiner 160 can be implemented in via cloud-based device(s) such as the network 150 (e.g., server(s), processor(s), and/or virtual machine(s) in the cloud 150 of FIG. 1). However, in other examples, the performance metrics determiner 160 is implemented by one or more of the processor(s) of the image capture device(s) 122, 124 and/or processor(s) of the edge device(s) 170. In some examples, some of the image data analysis is implemented by the performance metrics determiner 160 via a cloud-computing environment and one or more other parts of the analysis is implemented by one or more of the processor(s) of the image capture device(s) 122, 124 and/or processor(s) 130 of the edge device(s) 170 such as a smartphone.

In the examples disclosed herein, machine learning is used to improve efficiency of the performance metrics determiner 160 in evaluating the image data and generating performance metrics (e.g., velocity, stride length) for the subject(s) captured in the image data.

In the example of FIG. 3, the image resolution augmenter 305 of the example performance metrics determiner 160 evaluates image data received from the image capture device subsystem 120 (e.g., as represented by image data streams 371 including feeds from the first image capture device 122 (e.g., CAM 1) of FIG. 1, from an example second image capture device 370 (e.g., CAM 2), etc.) to determine if the image data should be adjusted (e.g., enhanced) to enable accurate analysis of the features of the image data and/or the subject(s) captured therein (e.g., to improve detection of the joints of the subject(s) in the image data). In examples disclosed herein, machine learning is used to improve efficiency of the image resolution augmenter 305 in evaluating the quality of the image data.

As shown in FIG. 3, the example system 100 includes a first computing system 358 to train a neural network to detect image resolution and to identify the image resolution of the image data should be adjusted (e.g., to improve a quality of the image data). The example first computing system 358 includes a first neural network processor 368. In examples disclosed herein, the first neural network processor 368 implements a first neural network. In some examples, the neural network is a generative adversarial network (GAN).

The example first computing system 358 of FIG. 3 includes a second neural network trainer 366. The example second neural network trainer 366 of FIG. 3 performs training of the neural network implemented by the second neural network processor 368. In some examples disclosed herein, training is performed using a stochastic gradient descent algorithm. However, other approaches to training a neural network may additionally or alternatively be used.

The example first computing system 358 of FIG. 3 includes a second training controller 364. The example training controller 364 instructs the second neural network trainer 366 to perform training of the neural network based on first training data 362. In the example of FIG. 3, the second training data 362 used by the second neural network trainer 366 to train the neural network is stored in a database 360. The example database 360 of the illustrated example of FIG. 3 is implemented by any memory, storage device and/or storage disc for storing data such as, for example, flash memory, magnetic media, optical media, etc. Furthermore, the data stored in the example database 360 may be in any data format such as, for example, binary data, comma delimited data, tab delimited data, structured query language (SQL) structures, image data, etc. While in the illustrated example database 360 is illustrated as a single element, the database 360 and/or any other data storage elements described herein may be implemented by any number and/or type(s) of memories.

In the example of FIG. 3, the training data 362 can include previously generated images having various image resolutions (e.g., high resolution images, low resolution images). In some examples, the training data includes previously generated image data that has undergone resampling such as downsampling. In some examples, the training data includes the image data streams 371 generated by the image capture devices(s) 122, 124, 370. The second neural network trainer 366 trains the neural network implemented by the neural network processor 368 using the training data 362. Based on the different image resolutions in the training data 362, the second neural network trainer 366 trains the neural network to identify (e.g., predict) features in the image data that will in higher image resolution.

An image quality model 372 is generated as a result of the neural network training. The image quality model 372 is stored in a database 369. The databases 360, 369 may be the same storage device or different storage devices.

The image resolution augmenter 305 executes the image quality model 372 to determine whether the resolution of the image data 371 received from the image capture devices 122, 124, 370 includes should be adjusted (e.g., enhanced) to provide for higher image resolution. The image resolution augmenter 305 generates image data having higher resolution in response to the execution of the image quality model 372. The performance metrics determiner 160 feeds the higher resolution image(s) output by the image resolution augmenter 305 to the subject detector 310.

The subject detector 310 of the example performance metrics determiner 160 of FIG. 3 provides means for identifying subjects in the image data received from the image resolution augmenter 305. To identify subjects in the image data, the subject detector 310 executes a neural network model that identifies subject(s) in the image data based on the detection of keypoints, or joints, of the subjects.

As shown in FIG. 3, the example system 100 includes a second computing system 373 to train a neural network to detect the presence of subject(s) in the image data. The example second computing system 373 includes a second neural network processor 380. In examples disclosed herein, the second neural network processor 380 implements a second neural network.

The example second computing system 373 of FIG. 3 includes a second neural network trainer 378. The example second neural network trainer 378 of FIG. 3 performs training of the neural network implemented by the second neural network processor 380. In some examples disclosed herein, training is performed using a stochastic gradient descent algorithm. However, other approaches to training a neural network may additionally or alternatively be used.

The example second computing system 373 of FIG. 3 includes a third training controller 376. The example training controller 376 instructs the third neural network trainer 378 to perform training of the neural network based on third training data 375. In the example of FIG. 3, the third training data 375 used by the third neural network trainer 378 to train the neural network is stored in a database 374. The example database 374 of the illustrated example of FIG. 3 is implemented by any memory, storage device and/or storage disc for storing data such as, for example, flash memory, magnetic media, optical media, etc. Furthermore, the data stored in the example database 374 may be in any data format such as, for example, binary data, comma delimited data, tab delimited data, structured query language (SQL) structures, image data, etc. While in the illustrated example database 374 is illustrated as a single element, the database 374 and/or any other data storage elements described herein may be implemented by any number and/or type(s) of memories.

In the example of FIG. 3, the training data 375 can include previously generated images including subject(s) in various pose(s) generated for purposes of training. In some examples, the training data includes the image data streams 371 generated by the image capture devices(s) 122, 124, 370. The training data 375 is labeled with joint or keypoint positions (e.g., (X, Y) coordinate positions) for each relevant keypoint (e.g., joint) of the subject(s) in a particular pose. The third neural network trainer 378 trains the neural network implemented by the neural network processor 380 using the training data 375. The third neural network trainer 378 trains the neural network to identify (e.g., predict) the two-dimensional positions of the keypoints of the respective subjects in the image data.

A subject detection model 383 is generated as a result of the neural network training. The subject detection model 383 is stored in a database 382. The databases 374, 382 may be the same storage device or different storage devices.

In the example of FIG. 3, the subject detector 310 executes the subject detection model 383 to identify subject(s) in the image data received from the image capture devices 122, 124, 370 using two-dimensional keypoint detection (e.g., 2D pose estimation). The example subject detector 310 extracts images (e.g., video frames) from the respective image data streams 371 received from each of the image capture devices 122, 124, 370. The subject detector 310 analyzes each extracted image to identify subject(s) in the images using the two-dimensional keypoint analysis on a frame-by-frame basis.

In some examples, the subject detector 310 refrains from identifying an element in the image data as a subject if a threshold number of keypoints are not identified (e.g., less than ten keypoints). As such, the subject detector 310 filters the image data to prevent inanimate objects and/or individuals who are only partially captured by the image data (e.g., cut off) and, thus, are not likely of interest for purposes of determining performing metrics, from being identified as subjects, thereby improving processing efficiencies of the performance metrics determiner 160

In the example of FIG. 3, the bounding box generator 315 generates bounding boxes for each subject identified in a given image (e.g., a video frame) of the respective image data streams 371. In examples disclosed herein, the bounding box generator 315 generates a bounding box for each subject based on the coordinates of the two-dimensional keypoints identified in the image data by the subject detector 310. In some examples, the bounding box generator 315 generates the bounding boxes using, for example, a region proposal, an object classification, and/or segmentation of the image data.

In examples disclosed herein, the subject detector 310 assigns a subject identifier to each bounding box representative of a subject identified in an image (e.g., a video frame)

In some examples, to decrease latency, the subject detector 310 generates a separate cloud node for each subject (e.g., a subject of interest such as an athlete) identified in a view of an image capture device 122, 124, 370 based on the respective bounding boxes and/or subject identifiers. As a result, the subject detector 310 can analyze data from multiple image capture devices substantially simultaneously or in parallel.

The tracker 320 tracks subject(s) across a given set of images (e.g., video frames) in an image data stream 371 to verify that each subject identifier (e.g., a bounding box and/or an identifier assigned to the bounding box) is consistent for each subject between frames. For example, in some instances, the subject detector 310 generates a first subject identifier for a bounding box in a first video frame and a second, different subject identifier for a bounding box in a second frame, even if the subject identified is the same subject in the first and second frames. The tracker 320 corrects any deviating subject identifiers to provide consistency in the tracking of the subject from frame to frame. For example, the tracker 320 can execute a tracking algorithm such as a Deep Simple Real Time Tracker (Deep SORT). The tracker 320 can implement the Deep SORT algorithm that includes a Kalman filter to account for any noise and uses a known prior state to predict a fit for the bounding boxes. A known prior state can include variables such as a center of the bounding box, an aspect ratio, and an image height. The tracker 320 implements the Deep SORT algorithm to convert contents of the bounding box information to a feature vector. The resulting feature vector can be used in addition to the bounding box position to determine the subject identifier for each subject in a given frame. More specifically, the feature vector can describe features of a given image (e.g., red, green, blue (RGB) color histograms), serving as an appearance descriptor of the individual being tracked. The tracker 320 executes the Deep SORT algorithm to assess the feature vectors to re-identify subject(s) within a given frame and verify that the subject(s) are consistently identified between frames. The tracker 320 can enhance the Deep SORT algorithm by tuning parameters such as detection frequency, detection thresholds, and/or tracking parameters.

The identifier 325 of the example performance metrics determiner 160 of FIG. 3 provides means for identifying subjects of interest with respect to the determination of performance metrics from subjects of non-interest in the image data. For example, the image capture devices 122, 124, 370 can be located at a sporting arena or stadium. In such examples, an athlete may be considered a subject of interest with respect to the determination of performance metrics and an individual such as a referee or a spectator may be considered a subject of non-interest. The identifier 325 identifies subject(s) of interest based on, for example, the field of play. For example, if the subjects identified in the image data (e.g., by the bounding boxes and/or subject identifiers) are not located within a specific section of a tracking area known to be a playing field (e.g., a track with runners), the identifier 325 identifies the subjects as subjects of non-interest. The identifier 325 can identify the playing field and/or the location of the subject(s) based on, for example, coordinate information for the views associated with the image capture devices and expected locations of the subject(s) of interest. In some examples, the identifier 325 can identify features of the playing field in the image data using image recognition rules. The coordinate information and/or other rules can be defined by user input(s) and stored in the database 355.

The identifier 325 filters the two-dimensional keypoint data generated by the subject detector 310 to remove the keypoints associated with the subjects of non-interest. The filtering performed by the identifier 325 improves processing efficiencies of the performance metrics determiner 160 by removing data that is not relevant to the performance metrics analysis.

The multi-view associator 330 associates the subject identifiers from different image device capture views with the same subject to provide for identification of respective subjects in the image data generated by the different image capture devices 122, 124, 370. For example, a plurality of image capture devices 122, 124, 370 (e.g., four cameras) can be located in a stadium to generate image data for an event, such as a track and field race. The use of multiple image capture devices 122, 124, 370 minimizes the effects of occlusion. For instance, although a subject may be only partially visible a view of a first image capture device, the subject may be fully visible in a view associated with a second image capture device.

In some examples, each image capture device 122, 124, 370 has a different view, a different angular speed, and/or different parameters. Therefore, as the respective image data feeds 371 from each image capture device 122, 124, 370 are fed to the performance metrics identifier 160, the total number of subject identifiers generated by the subject detector 310 exceeds the actual number of subjects in the image frames. For example, given a total of 4 cameras and 5 subjects of interest, up to 20 bounding boxes with unique subject identifiers can be generated, as the subject identifier 325 may assign a different subject identifier to a bounding box for the same subject in each image capture device view. To improve latency and accuracy, the multi-view associator 330 associates the different subject identifiers from each image capture device view to the same subject, thereby reducing the total number of subject identifiers to the actual number of unique individuals being tracked (e.g., from 20 different person identifiers to 5 subject identifiers for the 5 athletes being tracked). In examples, disclosed herein, the multi-view associator 330 executes a neural network to associate subject identifiers across image data streams.

As shown in FIG. 3, the example system 100 includes a fourth computing system 384 to train a neural network to associate multiple views. The example fourth computing system 384 includes a fourth neural network processor 389. In examples disclosed herein, the fourth neural network processor 389 implements a fourth neural network.

The example fourth computing system 384 of FIG. 3 includes a fourth neural network trainer 388. The example fourth neural network trainer 388 of FIG. 3 performs training of the neural network implemented by the fourth neural network processor 389. In some examples disclosed herein, training is performed using a stochastic gradient descent algorithm. However, other approaches to training a neural network may additionally or alternatively be used.

The example fourth computing system 384 of FIG. 3 includes a fourth training controller 387. The example training controller 387 instructs the fourth neural network trainer 388 to perform training of the neural network based on the fourth training data 386. In the example of FIG. 3, the fourth training data 386 used by the fourth neural network trainer 388 to train the neural network is stored in a database 385. The example database 385 of the illustrated example of FIG. 3 is implemented by any memory, storage device and/or storage disc for storing data such as, for example, flash memory, magnetic media, optical media, etc. Furthermore, the data stored in the example database 385 may be in any data format such as, for example, binary data, comma delimited data, tab delimited data, structured query language (SQL) structures, image data, etc. While in the illustrated example database 385 is illustrated as a single element, the database 385 and/or any other data storage elements described herein may be implemented by any number and/or type(s) of memories.

In the example of FIG. 3, the training data 386 can include previously generated images generated by image capture devices having different views. In some examples, the training data includes the image data streams 371 generated by the image capture devices(s) 122, 124, 370. The training data 386 is labeled, for example, subject identifiers (e.g., bounding boxes and/or other identifiers). The fourth neural network trainer 388 trains the neural network implemented by the neural network processor 389 using the training data 386. The fourth neural network trainer 388 trains the neural network to associate subject identifiers across images corresponding to different views.

A view association model 391 is generated as a result of the neural network training. The view association model 391 is stored in a database 390. The databases 385, 390 may be the same storage device or different storage devices.

The multi-view associator 330 executes the view association model 391 to associate subject identifiers in the respective image data feeds 371 received from the image capture devices 122, 124, 370 with the same subject. In some examples, to reduce latency and improve processing efficiency, the multi-view associator 330 generates a separate cloud node for each subject of interest to associate identifiers in the different image device capture views for multiple subjects in parallel.

The multi-view associator 330 time-synchronizes images generated by the different image capture devices 122, 124, 370 based on, for example, time-stamps. Thus, the multi-view associator 330 generates synchronized sets of images including different views generated by the respective image capture devices 122, 124, 370 at the same or substantially the same time. A synchronized set of images includes the same subject identifier for each subject identified in the respective views as a result of the execution of the view association model 391 by the multi-view associator 330. Thus, the multi-view associator 330 uses information from the image capture devices 122, 124, 370 to generate synchronized views and a unique common identifier for each subject across all views associated with the image capture devices 122, 124, 370.

In some examples, the tracker 320 provides for additional filtering of subjects who are not of interest in a given scenario (e.g., non-athletes) based on the reduced number of subject identifiers generated as a result of the multi-view association performed by the multi-view associator 330. For example, the tracker 320 can analyze the reduced number of subject identifiers to verify that the resulting subject identifiers correspond to subjects of interest (e.g., based on coordinates of the bounding boxes in the image data).

The two-dimensional (2D) keypoint extractor 335 extracts the keypoints from each subject of interest identified by a bounding box in each image in a set of synchronized image capture device views. In some examples, the 2D keypoint extractor 335 extracts or identifies a total of twenty-three keypoints for a subject based on the keypoints identified in the multiple views (e.g., based on the coordinate positions of the 2D keypoints). In some examples, the two-dimensional (2D) keypoint extractor 335 identifies keypoints between two images as associated with the same keypoint based on, for instance, coordinate positions of the keypoints and by reconciling the keypoint coordinate positions between the respective coordinate systems of the image capture devices. In some examples, comparison and refinement of 2D keypoints between related images is performed to improve accuracy of predicted keypoints. The keypoints can include: right ankle, right knee, right hip, left knee, left ankle, pelvis, thorax, neck, head, right wrist, right elbow, right shoulder, left shoulder, left elbow, left wrist, nose, right eye, right ear, left eye, left ear, right toe, and/or left toe. For example, if a total of 9 subjects of interest are being tracked using 5 different camera views, a total of 45 bounding boxes are assessed by the 2D keypoint extractor 335 to identify 2D keypoints of each subject in each view.

To improve efficiencies of the 2D keypoint extractor in extracting keypoints from the image data generated by the image capture devices, the 2D keypoint extractor 335 executes a neural network model.

As shown in FIG. 3, the example system 100 includes a computing system 392 to train a neural network to identify keypoints in image data generated for different views. The example fifth computing system 392 includes a fifth neural network processor 397. In examples disclosed herein, the fifth neural network processor 397 implements a fifth neural network.

The example fifth computing system 392 of FIG. 3 includes a fifth neural network trainer 396. The example fifth neural network trainer 396 of FIG. 3 performs training of the neural network implemented by the fourth neural network processor 397. In some examples disclosed herein, training is performed using a stochastic gradient descent algorithm. However, other approaches to training a neural network may additionally or alternatively be used.

The example fifth computing system 392 of FIG. 3 includes a fifth training controller 395. The example training controller 395 instructs the fifth neural network trainer 396 to perform training of the neural network based on fifth training data 394. In the example of FIG. 3, the fifth training data 394 used by the fifth neural network trainer 396 to train the neural network is stored in a database 393. The example database 393 of the illustrated example of FIG. 3 is implemented by any memory, storage device and/or storage disc for storing data such as, for example, flash memory, magnetic media, optical media, etc. Furthermore, the data stored in the example database 393 may be in any data format such as, for example, binary data, comma delimited data, tab delimited data, structured query language (SQL) structures, image data, etc. While in the illustrated example database 393 is illustrated as a single element, the database 393 and/or any other data storage elements described herein may be implemented by any number and/or type(s) of memories.

In the example of FIG. 3, the training data 394 can include previously generated images including subject(s) captured in different image capture device views. In some examples, the training data includes the image data streams 371 generated by the image capture devices(s) 122, 124, 370. The training data 394 is labeled with joint or keypoint positions (e.g., (X, Y) coordinate positions) for each relevant keypoint (e.g., joint) of the subject(s) in a particular pose in a particular image device capture view. The fifth neural network trainer 396 trains the neural network implemented by the neural network processor 397 using the training data 394. The fifth neural network trainer 396 trains the neural network to identify keypoints of a subject in different image device capture views and to recognize the same keypoints in different views (e.g., elbow keypoints, ankle keypoints) based on, for example, keypoint positions (e.g., a first keypoint position relative to another keypoint position to distinguish between an elbow joint and a knee joint).

A keypoint extraction model 399 is generated as a result of the neural network training. The keypoint extraction model 399 is stored in a database 398. The databases 393,398 may be the same storage device or different storage devices. The 2D keypoint extractor 335 executes the keypoint extraction model 399 to extract two-dimensional keypoints from image data. The 2D keypoint extractor 335 recognizes keypoints in the different image views (e.g., recognizes a joint as corresponding to an elbow joint in a first image, second image, third image, and so forth). As a result, the 2D keypoint extractor 335 can aggregate the joint information from all views, thereby improving keypoint prediction accuracy and performance. Additionally, the 2D keypoint extractor 335 is able to account for scenarios in which there are occlusions in some image views. For example, an elbow joint of a subject may be blocked in a first image. However, the 2D keypoint extractor 335 can extract the elbow joint for the subject using keypoint data from other views in which the elbow joint is not blocked.

The three-dimensional (3D) keypoint generator 340 generates three-dimensional keypoints based on inputs from the 2D keypoint extractor 335. The 3D keypoint generator 340 combines 2D keypoints extracted from each image capture device view in a synchronized set of images to generate 3D keypoints. For example, the 3D keypoint generator 340 uses the subject identifier associations from the image capture device views in a synchronized set of images and combines all related views of the corresponding 2D keypoints to generate a 3D keypoint representation of each subject of interest (e.g., where the 3D keypoint data can be stored in matrix or vector form and/or include graphical models generated from the keypoints). In some examples, the 3D keypoint generator 340 uses a custom triangulation mathematical model, a custom polyhedron model, and/or a unique inverse kinematics (IK) solver to determine the 3D keypoints. For example, the triangulation mathematical model extracts 3D locations of joints based on the positions of the 2D keypoints. In some examples, the 3D keypoint generator 340 weighs the 2D keypoints identified in each image capture device view can to determine whether a particular image device view should be favored more heavily in determining the location of the 3D keypoint, as some joint positions may not be accurately estimated by the subject detector 310 in certain image capture devices views due to occlusion. In some examples, the 3D keypoint extractor 340 executes an IK solver that uses kinematic equations to determine joint parameters such as joint angles. The 3D keypoint generator 340 generate a motion profile using the 3D keypoints and changes in joint angles detected from the image data generated over time. The motion profile(s) for each subject of interest can be stored in the database 355 (e.g., as matrix and/or vector data and/or graphical model(s)).

The biomechanics analyzer 345 determines subject movement performance metrics based on the 3D keypoints (e.g., the motion profile(s)) generated by the 3D keypoint generator 340. In some examples, the biomechanics analyzer 345 implements a noise filter to provide noise reduction in the keypoint data in an effort to increase an accuracy of performance metric calculations. Additionally or alternatively, the biomechanics analyzer 345 can implement the IK modeling algorithm to create a kinematic chain using the 3D keypoints. The kinematic chain can be modeled on typical or expected human movement to further refine the 3D keypoint positions.

The performance metrics calculator 350 of the biomechanics analyzer 345 calculates performance metrics for each subject of interest (e.g., an athlete) based on the positions of the 3D keypoints of the subject and/or changes in the positions of the 3D keypoints over time. For example, the performance metrics can include velocity, acceleration, shoulder sway, a center of mass, stride frequency, etc. In some examples, the performance metrics calculator calculates a metric based on specific weights assigned to each 3D keypoint for a given subject of interest, the activity being performed, and/or the metric of interest. For example, the performance metrics calculator 350 can assign a greater weight to neck and shoulder keypoints for velocity-based calculations (e.g., compared to keypoints associated with a toe). Likewise, the performance metrics calculator 350 can assign greater weight to toe and ankle keypoints for calculations associated with stride frequency. The weights assigned to the keypoints can be defined by user input(s) and stored in the database 355.

The database 355 stores any information relevant to the determination of performance metrics, including augmented images, extracted 2D keypoints, generated 3D keypoints, and calculated performance metrics. In some examples, the database 355 stores processed camera feeds to permit playbacks and/or recalculations of any performance metrics based on adjustments to, for example, the neural network models 372, 383, 391, 399. The example database 355 of the illustrated example of FIG. 3 is implemented by any memory, storage device and/or storage disc for storing data such as, for example, flash memory, magnetic media, optical media, etc. Furthermore, the data stored in the example database 355 may be in any data format such as, for example, binary data, comma delimited data, tab delimited data, structured query language (SQL) structures, image data, etc.

While an example manner of implementing the performance metrics determiner 160 of FIG. 1 is illustrated in FIG. 3, one or more of the elements, processes and/or devices illustrated in FIG. 3 may be combined, divided, re-arranged, omitted, eliminated and/or implemented in any other way. Further, the example image resolution augmenter 305, the example subject detector 310, the example bounding box generator 315, the example tracker 320, the example identifier 325, the example multi-view associator 330, the example two-dimensional (2D) keypoint extractor 335, the example three-dimensional (3D) keypoint generator 340, the example biomechanics analyzer 345, the example performance metrics calculator 350, the example database 355, and/or, more generally, the example performance metrics determiner 160 of FIGS. 1 and/or 3 may be implemented by hardware, software, firmware and/or any combination of hardware, software and/or firmware. Thus, for example, any of the example image resolution augmenter 305, the example subject detector 310, the example bounding box generator 315, the example tracker 320, the example identifier 325, the example multi-view associator 330, the example two-dimensional (2D) keypoint extractor 335, the example three-dimensional (3D) keypoint generator 340, the example biomechanics analyzer 345, the example performance metrics calculator 350, the example database 355, and/or, more generally, the example performance metrics determiner 160 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image resolution augmenter 305, the example subject detector 310, the example bounding box generator 315, the example tracker 320, the example identifier 325, the example multi-view associator 330, the example two-dimensional (2D) keypoint extractor 335, the example three-dimensional (3D) keypoint generator 340, the example biomechanics analyzer 345, the example performance metrics calculator 350, and the example database 355 is/are hereby expressly defined to include a non-transitory computer readable storage device or storage disk such as a memory, a digital versatile disk (DVD), a compact disk (CD), a Blu-ray disk, etc. including the software and/or firmware. Further still, the example performance metrics determiner 160 of FIGS. 1 and/or 3 may include one or more elements, processes and/or devices in addition to, or instead of, those illustrated in FIGS. 1 and 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the second computing system 358 is illustrated in FIG. 3, one or more of the elements, processes and/or devices illustrated in FIG. 3 may be combined, divided, re-arranged, omitted, eliminated and/or implemented in any other way. Further, the example neural network processor 368, the example trainer 366, the example training controller 364, the example database(s) 360, 369 and/or, more generally, the example second computing system 358 of FIG. 3 may be implemented by hardware, software, firmware and/or any combination of hardware, software and/or firmware. Thus, for example, any of the example neural network processor 368, the example trainer 366, the example training controller 364, the example database(s) 360, 369, and/or more generally the example second computing system 358 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example neural network processor 368, the example trainer 366, the example training controller 364, and/or the example database(s) 360, 369 is/are hereby expressly defined to include a non-transitory computer readable storage device or storage disk such as a memory, a digital versatile disk (DVD), a compact disk (CD), a Blu-ray disk, etc. including the software and/or firmware. Further still, the example first computing system 358 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the third computing system 373 is illustrated in FIG. 3, one or more of the elements, processes and/or devices illustrated in FIG. 3 may be combined, divided, re-arranged, omitted, eliminated and/or implemented in any other way. Further, the example neural network processor 380, the example trainer 378, the example training controller 376, the example database(s) 373, 382 and/or, more generally, the example second computing system 373 of FIG. 3 may be implemented by hardware, software, firmware and/or any combination of hardware, software and/or firmware. Thus, for example, any of the example neural network processor 380, the example trainer 378, the example training controller 376, the example database(s) 374, 382, and/or more generally the example third computing system 373 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example neural network processor 380, the example trainer 378, the example training controller 376, and/or the example database(s) 374, 382 is/are hereby expressly defined to include a non-transitory computer readable storage device or storage disk such as a memory, a digital versatile disk (DVD), a compact disk (CD), a Blu-ray disk, etc. including the software and/or firmware. Further still, the example third computing system 373 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the fourth computing system 384 is illustrated in FIG. 3, one or more of the elements, processes and/or devices illustrated in FIG. 3 may be combined, divided, re-arranged, omitted, eliminated and/or implemented in any other way. Further, the example neural network processor 389, the example trainer 388, the example training controller 387, the example database(s) 385, 390 and/or, more generally, the example fourth computing system 384 of FIG. 3 may be implemented by hardware, software, firmware and/or any combination of hardware, software and/or firmware. Thus, for example, any of the example neural network processor 389, the example trainer 388, the example training controller 387, the example database(s) 385, 390, and/or more generally the example fourth computing system 384 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example neural network processor 389, the example trainer 388, the example training controller 387, and/or the example database(s) 385, 390 is/are hereby expressly defined to include a non-transitory computer readable storage device or storage disk such as a memory, a digital versatile disk (DVD), a compact disk (CD), a Blu-ray disk, etc. including the software and/or firmware. Further still, the example third computing system 384 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the fifth computing system 392 is illustrated in FIG. 3, one or more of the elements, processes and/or devices illustrated in FIG. 3 may be combined, divided, re-arranged, omitted, eliminated and/or implemented in any other way. Further, the example neural network processor 397, the example trainer 396, the example training controller 395, the example database(s) 393,398 and/or, more generally, the example fifth computing system 392 of FIG. 3 may be implemented by hardware, software, firmware and/or any combination of hardware, software and/or firmware. Thus, for example, any of the example neural network processor 397, the example trainer 396, the example training controller 395, the example database(s) 393, 398, and/or more generally the example fifth computing system 392 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example neural network processor 397, the example trainer 396, the example training controller 395, and/or the example database(s) 393, 398 is/are hereby expressly defined to include a non-transitory computer readable storage device or storage disk such as a memory, a digital versatile disk (DVD), a compact disk (CD), a Blu-ray disk, etc. including the software and/or firmware. Further still, the example fifth computing system 392 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the performance metrics determiner 160 of FIGS. 1 and 3 are shown in FIGS. 4 and 6-10. A flowchart representative of example hardware logic, machine readable instructions, hardware implemented state machines, and/or any combination thereof for implementing the example second computing system 358 of FIG. 3 is shown in FIG. 5A. A flowchart representative of example hardware logic, machine readable instructions, hardware implemented state machines, and/or any combination thereof for implementing the example third computing system 373 of FIG. 3 is shown in FIG. 5B. A flowchart representative of example hardware logic, machine readable instructions, hardware implemented state machines, and/or any combination thereof for implementing the example fourth computing system 384 of FIG. 3 is shown in FIG. 5C. A flowchart representative of example hardware logic, machine readable instructions, hardware implemented state machines, and/or any combination thereof for implementing the example fifth computing system 392 of FIG. 3 is shown in FIG. 5D. The machine readable instructions may be an executable program or portion of an executable program for execution by a computer processor such as the processor(s) 1512, 1612, 1712, 1812, 1912 shown in the example processor platform(s) 1500, 1600, 1700, 1800, 1900 discussed below in connection with FIGS. 15-19. The program(s) may be embodied in software stored on a non-transitory computer readable storage medium such as a CD-ROM, a floppy disk, a hard drive, a DVD, a Blu-ray disk, or a memory associated with the processor(s) 1512, 1612, 1712, 1812, 1912 but the entire program and/or parts thereof could alternatively be executed by a device other than the processor(s) 1512, 1612, 1712, 1812, 1912 and/or embodied in firmware or dedicated hardware. Further, although the example program(s) are described with reference to the flowcharts illustrated in FIGS. 4-10, many other methods of implementing the example performance metrics determiner 160, the example second computing system 358, the example third computing system 373, the example fourth computing system 384, and/or the example fifth computing system 392 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 4:
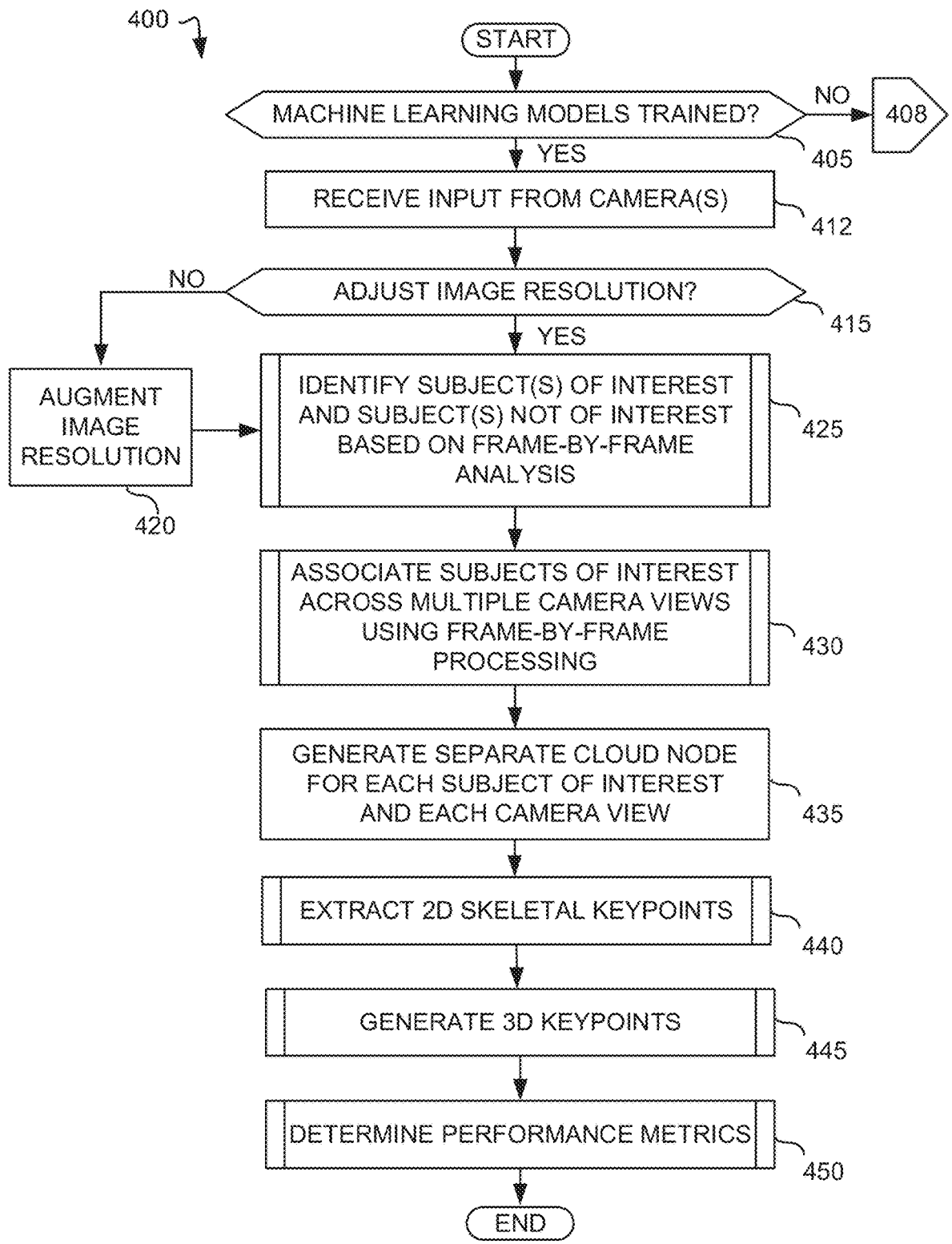
FIG. 4 is a flowchart representative of example machine readable instructions which may be executed to implement the example performance metrics determiner of FIG. 3.

FIG. 4 is a flowchart 400 representative of example machine readable instructions which may be executed to implement the example performance metrics determiner 160 of FIGS. 1 and/or 3 to determine performance metric(s) (e.g., velocity, stride length) for subject(s) of interest from image data. As disclosed herein, machine learning model(s) that are executed by the performance metric determiner 160 are trained by the trainers 366, 378, and/or 392 (block 405). If the machine learning model(s) have not been trainer or require additional training (e.g., re-training), control proceeds to block 408 (e.g., training of the machine learning model(s), as described in connection with FIGS. 5A, 5B, and 5C).

The performance metrics determiner 160 receives input from the capture system 110 via the network 150. For example, the performance metrics determiner 160 receives image data feed(s) 371 from the image capture device(s) 122, 124, 370 (block 412). In some examples, only a selected number of image capture devices may be used, depending on, for instance the total number of views desired.

The image resolution augmenter 305 analyzes image data to determine whether resolution of the image data should be adjusted (block 415). In some examples, the image resolution augmenter 305 adjusts (e.g., enhances) image resolution to improve image quality to facilitate detection of subjects and/or features of the subjects (e.g., joints) (block 420). For example, the image resolution augmenter 305 can execute the image quality model 372 to determine if the image resolution should be adjusted.

The image resolution augmenter 305 provides the image(s) to the subject detector 310, the tracker 320, and/or the identifier 325 to identify subject(s) of interest (e.g., athlete(s)) and subject of non-interest (e.g., spectator(s)) in the image data on frame-by-frame analysis (block 425), as described in further detail in connection with FIG. 6. For example, the subject detector 310 executes the subject detection model 383 to identify two-dimensional keypoints of the subject. The bounding box generator 315 creates bounding boxes for each subject in the image. In some examples, the subject detector 310 refrains from identifying element(s) in the image data that have an insufficient number of keypoints as subject(s) (e.g., a number of joints expected in a human as opposed to an inanimate object). The tracker 320 tracks individuals across a given set of image frames to verify that each subject identifier is consistent for each person tracked from frame to frame. The identifier 325 determines whether any subjects identified within a given image are not subjects of interest (e.g., athletes) based on the position of the keypoints and/or bounding boxes identifying the subject relative to, for example, a location of a field of play.

In FIG. 4, the multi-view associator 330 associates subjects of interest across multiple image device capture views using frame-by-frame-processing (block 430), as described in more detail in connection with FIG. 7. For example, the multi-view associator 330 associates different subject identifiers from different image device capture views to the same subject, thereby reducing the total number of subject identifiers to the actual total number of unique subjects being tracked. The multi-view associator 330 can generate a set of time-synchronized images from each image data stream 371 to associated different views generated by each image capture device at the same or substantially the same time.

To decrease latency, the multi-view associator 330 also generates a separate cloud node for each subject of interest and each camera view (block 435). For example, the deployment and management of the performance metrics determiner 160 can rely on a select number of worker nodes that can be scaled to achieve a desired latency. This can be accomplished by allowing the worker node to move on to the next available frame once processing of one frame is complete. Such a set up can be replicated for all image data streams 371 in parallel, as described in connection with FIG. 13.

The 2D keypoint extractor 335 extracts keypoints from each subject of interest identified by a bounding box in each image in a set of synchronized image capture device views (block 440). As described in more detail in connection with FIG. 8, the 2D keypoint extractor 335 extracts keypoints based on joint locations or other key markers of positioning (e.g., knee, elbow, wrist, etc.).

The extracted 2D keypoints are provided to the 3D keypoint generator 340, which generates 3D keypoints based on a combination of 2D keypoints extracted from the multiple image capture device views (block 445). As described in more detail in connection with FIG. 9, the 3D keypoint generator 340 can extract three-dimensional locations of joints from the 2D keypoint data by implementing an inverse kinematics and/or triangulation-based mathematical models.

The biomechanics analyzer 345 and performance metrics calculator 350 translate 3D keypoints generated by the 3D keypoint generator 340 into related human movement performance metrics (block 450). For example, the performance metrics calculator 350 can determine performance metrics such as velocity, acceleration, shoulder sway, and/or a center of mass, among others, based on specific weights of each 3D keypoint for a given subject of interest, as described in more detail in connection with FIG. 10.

FIG. 5A is a flowchart 408 representative of example machine readable instructions which may be executed to implement elements of the example second computing system 358, the example third computing system 373, the example fourth computing system 384, and/or the example fifth computing system 392 to cause the computing system(s) to 358, 373, 384, 392 to train neural networks. In the example of FIG. 5A, if the image quality model 372 has not been trained (block 501), control proceeds to block 525 of FIG. 5B. Likewise, if the subject detection model 383 has not been trained (block 502), control proceeds to block 550 of FIG. 5C. Likewise, if the keypoint extraction model 399 has not been trained (block 503), control proceeds to block 575 of FIG. 5D. The example instructions 408, 525, 550, 575 when executed by the respective computing systems 358, 373, 384, 392 of FIG. 3, result in neural networks and/or model(s) thereof, that can be distributed to other computing systems, such as the performance metric determiner 160 of FIG. 3.

If the view association model 391 is to be trained, control proceeds to block 505, which may be executed by the fourth computing system 384 of FIG. 3 to train a neural network to generate the model 391. The trainer 388 accesses training data 386 (block 505). The training data 386 can include image data including different views. The trainer 388 identifies data features represented by the training data 386 (e.g., identification of subject identifiers such as bounding boxes) (block 510). The training controller 387 instructs the trainer 388 to perform training of the neural network using the training data 386 to generate a view association model 391 (block 515). In some examples, additional training is performed to refine the model 391 (block 520).

FIG. 5B is a flowchart 525 representative of example machine readable instructions which may be executed to implement elements of the first computing system 358 of FIG. 3, the flowchart representative of instructions to train a neural network to generate an image quality model 372. The trainer 366 accesses training data 362 (block 530). The training data can include images having different resolutions. The trainer 366 identifies data features represented by the training data 362 (e.g., image resolutions and features that can be used to adjust image resolution) (block 535). The training controller 364 instructs the trainer 366 to perform training of the neural network (e.g., a generative adversarial network (GAN) using the training data 362 to generate an image quality model 372 (block 540). In the example of FIG. 5A, the machine learning model is an image quality model 372. In some examples, additional training is performed to refine the model 372 (block 545).

FIG. 5C is a flowchart 550 representative of example machine readable instructions which may be executed to implement elements of the example the computing system 373 of FIG. 3, the flowchart representative of instructions to train a neural network to generate a subject detection model. The trainer 378 accesses training data 375 (block 555). The training data can include images with two-dimensional keypoints of subjects in different poses labeled. The trainer 378 identifies data features represented by the training data 375 (e.g., locations of the keypoints) (block 560). The training controller 376 instructs the trainer 378 to perform training of the neural network using the training data 375 to generate a subject detection model 383 (block 565). In some examples, additional training is performed to refine the model 383 (block 570).

FIG. 5D is a flowchart representative of example machine readable instructions which, when executed by another computing system of FIG. 3, cause the computing system to train a neural network to generate a keypoint extraction model. In the example of FIG. 5D, the trainer 396 accesses training data 394 (block 580). The training data 394 can include image data including different views. The trainer 396 identifies data features represented by the training data 394 (e.g., data features to extract keypoints) (block 585). The training controller 395 instructs the trainer 396 to perform training of the neural network using the training data 394 to generate a keypoint extraction model 399 (block 590). In some examples, additional training is performed to refine the model 399 (block 595).

Figure 6:
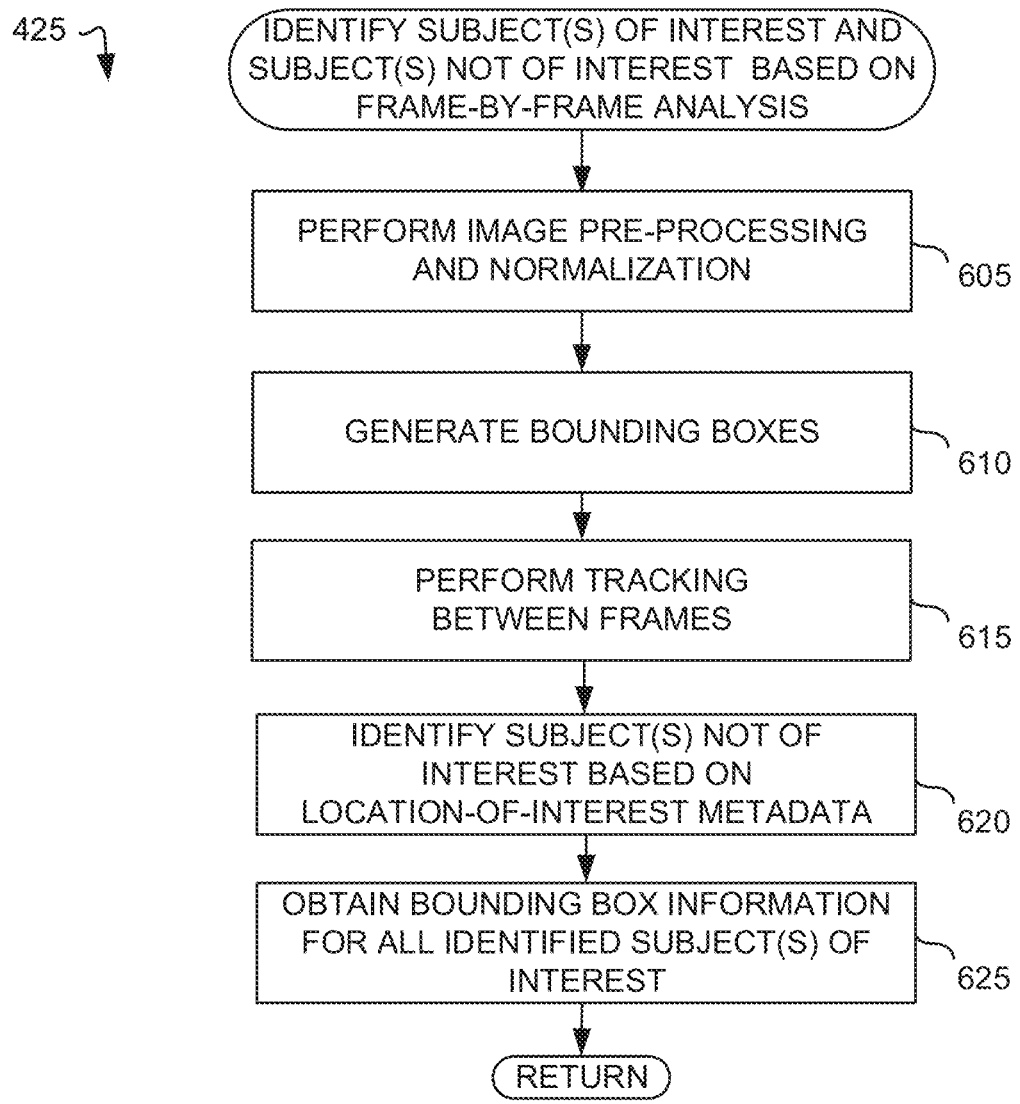
FIG. 6 is a flowchart representative of example machine readable instructions which may be executed to implement elements of the example performance metrics determiner of FIG. 3, the flowchart representative of instructions used to identify subject(s) of interest and subject(s) of non-interest based on image analysis.

FIG. 6 is a flowchart 425 representative of example machine readable instructions which may be executed to implement elements of the example performance metrics determiner 160 of FIG. 3, the flowchart representative of instructions used to identify subject(s) of interest and subject(s) not of interest based on frame-by-frame analysis of image data. At block 605, the subject detector 310 executes the subject detection model 383 to identify two-dimensional keypoints (e.g., (X, Y) coordinates of joints) of the subjects in the image data. In some examples, the subject detector 310 filters out any detected individuals who are missing a threshold number of keypoints detected.

The bounding box generator 315 generates bounding boxes for each subject in a given image (block 610). In some examples, the subject detector 310 can assign a subject identifier for each unique subject detected in a given frame, such that the subject identifier is linked to a bounding box.

The tracker 320 tracks individuals across a given set of camera frames (block 615). The tracker 320 corrects any deviating subject identifiers between frames to ensure that there is consistency in the tracking of the subjects from frame to frame in an image data stream (e.g., via execution of a Deep SORT tracking algorithm).

The identifier 325 identifies one or more subject(s) not of interest with respect to determination of the performance metrics based on location-of-interest metadata (block 620). For example, with respect to image data generated for sporting events, if the subject(s) identified (e.g., by bounding boxes and/or subject identifiers) are not within a specific section of a tracking area known to be a playing field (e.g., a track with runners), such subjects are identified as subjects not of interest and removed from further processing by the performance metrics determiner 160. The subject(s) can be identified as subject(s) of interest or non-interest based on keypoint position relative to locations of interest in the image data.

The performance metrics determiner 160 obtains bounding box information for the subject(s) of interest for each image capture device view (block 625). Control returns to block 430 of FIG. 4.

Figure 7:
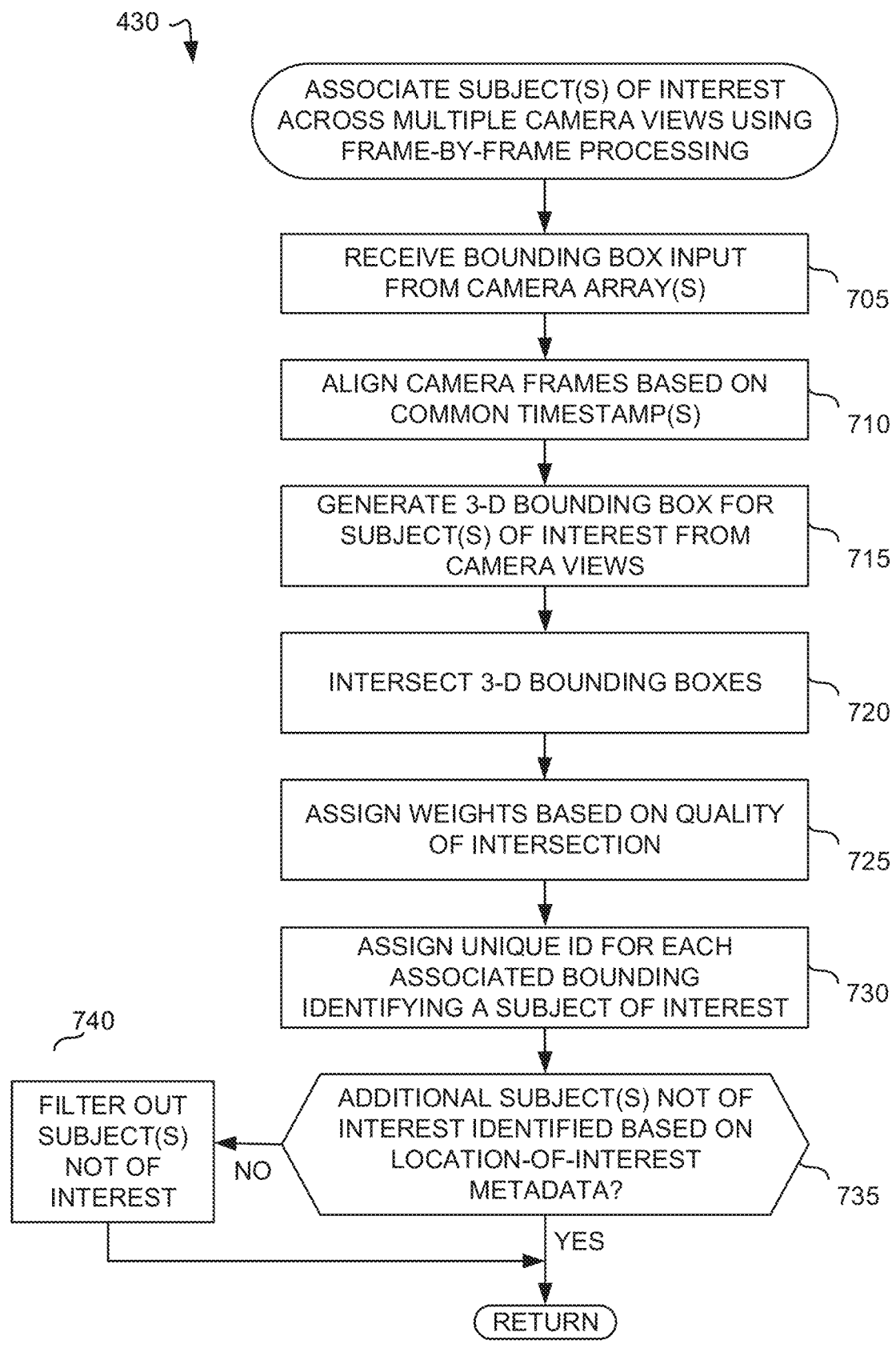

FIG. 7 is a flowchart 430 representative of example machine readable instructions which may be executed to implement elements of the example performance metrics determiner 160 of FIG. 3, the flowchart representative of instructions used to associate subjects of interest across multiple image capture device views using frame-by-frame processing. The multi-view associator 330 receives bounding box input(s) for respective views associated with one or more image capture devices (block 705). In some examples, the multi-view associator 330 associates different subject identifiers from different image capture device views generated for each bounding box to the same subject, thereby reducing the total number of person identifiers to the actual total number of unique individuals being tracked (e.g., from 20 different person identifiers down to 5 person identifiers for each athlete being tracked when using 5 individuals with 4 camera views).

In some examples, the multi-view associator 330 aligns frames in each image data stream received from an image capture device based on common timestamps to generate synchronized sets of images (block 710). Using the aligned frames and/or the unique subject identifiers, the multi-view associator 330 generates a 3D bounding box for subject(s) of interest from the capture device views in a given synchronized set of images (block 715). For example, the multi-view associator 330 aligns the 2D bounding boxes generated using the bounding box generator 315 to create 3D bounding boxes that reflect each of the image capture device views used for the multi-subject tracking via the capture device subsystem 120.

The multi-view associator 330 intersects the 3D bounding boxes from the image capture devices (e.g., CAM 1, CAM 2, CAM N, etc.) (block 720), as shown in connection with FIG. 12A. The multi-view associator 330 can assign weights based on the quality of bounding box intersection (block 725). For example, by assigning weights, the multi-view associator 330 determines the level of accuracy associated with the generated 3D bounding box for each individual subjects of interest based on the compiled information from the image capture devices. If there is a sufficient level of accuracy associated with the generated bounding boxes, the multi-view associator 330 assigns unique subject identifiers for each associated bounding to identify a subject of interest (block 730). For example, once the 3D bounding box is generated, each subject of interest is assigned the subject identifier that was previously independently associated with each 2D bounding box in each camera view. For example, the initial set of identifiers (e.g., a total of 20 identifiers for 5 subjects of interest and 4 camera views) is reduced to the actual number of identifiers needed based on the total number of subjects of interest being tracked (e.g., 5 person identifiers) and/or the total number of 3D bounding boxes formed (e.g., one 3D bounding box for each of the 5 subjects of interest).

The multi-view associator 330 also allows for additional filtering out of subjects who are not of interest in a given scenario (e.g., non-athletes) given that the combination of all image capture device views allows for additional verification of subjects of interest versus subjects not of interest. For example, the tracker 320 can identify additional subjects not of interest based on location-of-interest (e.g., field-of-play) metadata (block 735). If additional subjects not of interest are identified based on the newly generated 3D bounding boxes and evaluation of the field-of-play metadata, the multi-view associator 330 filters out the subjects not of interest (block 740). Control returns to block 435 of FIG. 4.

FIG. 8 is a flowchart 440 representative of example machine readable instructions which may be executed to implement elements of the example performance metrics determiner 160 of FIG. 3, the flowchart representative of instructions used to extract two-dimensional skeletal keypoints. The 2D keypoint extractor 335 retrieves bounding box and image frame information from the multi-view associator 330 and/or the database 355. In some examples, the 2D keypoint extractor 335 crops a given image using the bounding box region of interest (ROI) (block 810). This allows the 2D keypoint extractor 335 to infer or detect 2D skeletal keypoints based on the bounding box-derived ROI (block 815). Because subjects not of interest are filtered out using the multi-view associator 330 and the 2D keypoint extraction is limited to the bounding box ROI, the amount of pixels assessed by the 2D keypoint extractor 335 is reduced, thereby improving processing efficiency and decreasing latency. In some examples, the 2D keypoint extractor 335 extracts a total of 23 individual keypoints based on joint location and/or other human-based positioning markers (e.g., right ankle, right knee, right hip, left knee, left ankle, pelvis, thorax, neck, head, right wrist, right elbow, right shoulder, left shoulder, left elbow, left wrist, nose, right eye, right ear, left eye, left ear, right toe, and/or left toe), as shown in connection with FIG. 12B. The 2D keypoint extractor 335 proceeds to extract 2D skeletal keypoints for each subject of interest at each image capture device view in a synchronized set of images (block 820). Once the keypoints have been extracted, the output from the extraction is received by the 3D keypoint generator 340 (block 445 of FIG. 4). If additional keypoints are to be extracted, control returns to block 805 to allow the 2D keypoint extractor 335 to continue extracting keypoints based on retrieved bounding box and camera frame information for each camera view (block 805).

FIG. 9 is a flowchart 445 representative of example machine readable instructions which may be executed to implement elements of the example performance metrics determiner 160 of FIG. 3, the flowchart representative of instructions used to generate three-dimensional keypoints. The 3D keypoint generator 340 or evaluates the 2D keypoints extracted from the image capture device views to generate the 3D keypoints. The keypoint generator 340 collects bounding box information from image device capture views for each subject of interest, which can include the 2D keypoints extracted using the 2D keypoint extractor 335 (bock 905). In some examples, the keypoint generator 340 determines whether image frames are aligned prior to generating the 3D keypoints (block 910). If the image frames are not aligned, the camera frames can be aligned based on timestamps (block 915). In some examples, the 3D keypoint generator 340 uses a custom triangulation mathematical model to determine positions of 3D keypoints (block 920). In some examples, the 3D keypoint generator 340 uses a unique inverse kinematics (IK) solver to improve an accuracy of the predicted positions of the 3D keypoints. For example, the triangulation mathematical model extracts 3D locations of joints. In some examples, each image capture device view can be assessed to determine its contribution to the 3D keypoint generation given that some joints may not be precisely estimated from certain image capture device views due to occlusion. The 3D keypoint generator 340 continues to generate 3D keypoints for each subject of interest and each camera view (block 925). In some examples, the 3D keypoint generator 340 generates motion profile(s) for the subject(s) of interest based on changes in the positions of the 3D keypoints between frames.

FIG. 10 is a flowchart 450 representative of example machine readable instructions which may be executed to implement elements of the example performance metrics determiner 160 of FIG. 3, the flowchart representative of instructions used to determine performance metric(s) for the subject(s) of interest. In some examples, prior to the calculation and/or evaluation of performance metrics, the biomechanics analyzer 345 performs noise reduction on the input data (block 1005). For example, the biomechanics analyzer 345 can use a custom noise filter to provide noise reduction for improved quality of the data. Additionally, the biomechanics analyzer 345 applies kinematics modeling to refine the 3D keypoint positions (block 1010). For example, the biomechanics analyzer 345 can use inverse kinematics (IK) modeling to create a kinematic chain using the generated 3D keypoints. For example, the kinematic chain can be modeled on typical human movement to further refine the 3D keypoint positions. The performance metrics calculator 350 calculates performance metrics for each subject of interest (e.g., an athlete) based on the 3D keypoints (block 1015). The performance metrics can include, for example, velocity, acceleration, shoulder sway, a center of mass, stride frequency, etc. In some examples, the performance metrics are calculated based on specific weights of each 3D keypoint for a given subject of interest. For example, the performance metrics calculator 350 can place larger weight on neck and shoulder keypoints for velocity-based calculations (e.g., compared to keypoints associated with a toe). In some examples, the performance metrics calculations can be performed at an edge device (e.g., edge device(s) 170). In some examples, the performance metrics can be adjusted based on the level of accuracy desired (e.g., distinguishing stride frequency between athletes running at 13-15 miles per hour, comparing velocity, position, and/or acceleration with an accuracy of 1/10th of a mile per hour, etc.).

FIG. 11A illustrates example implementation of the image capture device subsystem 120 of FIG. 1 in an environment, where the example environment includes a stadium 1100. In the example of FIG. 11A, a total of four image capture devices 122, 370, 1104, 1108 (e.g., cameras) are positioned at various locations throughout the stadium 1100 to capture athletes competing in, for instance, a track and field event. Additional or fewer image capture devices can be used. Position(s) and/or orientation(s) of the four image capture devices 122, 370, 1104, 1108 are controlled via designated pan-tilt unit(s) 126, 1102, 1106, 1110, respectively. In some examples, the image capture devices 122, 370, 1104, and/or 1108 can be positioned to minimize occlusion of the subjects of interest (e.g., the runners). In some examples, the cameras 122, 370, 1104, and/or 1108 can be positioned based on expected athlete height and/or location. In some examples, the positioning of cameras 122, 370, 1104, and/or 1108 can be determined based on the expected performance metrics calculations (e.g., number of camera views and/or 3D bounding boxes needed for accurate calculations).

FIG. 11B illustrates example image frame 1150 generated by one of the image capture devices 122, 370, 1104, 1108. In the example of FIG. 11B, a two-dimensional bounding box is generated for individuals in the image frame 1150 captured by the image capture device. For example, the bounding box generator 315 generates an example two-dimensional bounding box 1154 for each of the athletes along an example running track 1152. Likewise, the bounding box generator 315 generates an example bounding box 1156 for a non-athlete. In some examples, the identifier 325 determines whether any individuals identified within a given camera frame are not athletes, thereby filtering them out to reduce processing loads for the multi-view associator 330. In some examples, the identifier 325 can filter out any non-athletes based on the field of play. In the example of FIG. 11B, any individuals not located on the track 1152 (e.g., the field of play), such as the non-athlete identified using bounding box 1156, can be filtered out (e.g., based on the coordinates of the bounding box 1156 relative to coordinates defining the field of play). Once the bounding box is generated, the subject detector 310 can also assign a person identifier to each bounding box representative of an individual being tracked in every camera frame (e.g., an athlete identified using bounding box 1154 can be assigned a person identifier specific to that bounding box which assists in tracking the athlete from frame-to-frame).

FIG. 12A illustrates example three-dimensional bounding box data 1200 generated in accordance with teachings of this disclosure and, in particular, illustrates three-dimensional bounding box generation based on the bounding box information of FIG. 11B obtained for each athlete-of-interest from each image capture device view associated with the image capture devices 122, 370, 1104, 1108 of FIG. 11A. As previously disclosed in connection with FIG. 11B, any subjects identified to be non-athletes (e.g., individual identified using the bounding box 1156 of FIG. 11B) is filtered out to reduce the processing burden on the performance metric determiner 160. In some examples, the multi-view associator 330 generates a 3D bounding box for athlete(s) of interest from the example image device capture views 1202, 1204, 1206, 1208 from each of the cameras 122, 370, 1104, 1108, respectively. In some examples, the multi-view associator 330 aligns or synchronizes frames captured by the views 1202, 1204, 1206, 1208 based on timestamps. For example, the multi-view associator 330 combines or aligns the 2D bounding boxes generated using the bounding box generator 315 to create 3D bounding boxes that reflect each of the camera views 1202, 1204, 1206, 1208 for each of the athletes of interest. In the example of FIG. 12A, an example 3D bounding box 1210 is generated for a first athlete of interest. In some examples, the 3D bounding boxes can be generated for all athletes of interest or a specific number of athletes (e.g., the lead runner, the first and second lead runners, etc.). In the example of FIG. 12A, each 3D bounding box can be assigned the subject identifier associated with the athlete of interest. For example, the initial set of identifiers (e.g., a total of 40 identifiers for 8 athletes and 4 camera views) is reduced to the actual number of identifiers needed based on the total number of athletes being tracked (e.g., 8 person identifiers) and/or the total number of 3D bounding boxes formed (e.g., one 3D bounding box for each of the 8 athletes), such that the subject identifier associated with bounding box 1210 is unique to the athlete being tracked using the 3D bounding box 12010, while the subject identifier associated with example bounding box 1212 is unique to the athlete being tracked using the 3D bounding box 1212.

FIG. 12B illustrates example two-dimensional keypoints 1250 and example three-dimensional keypoints 1292 in accordance with teachings of this disclosure and, in particular, illustrates two-dimensional keypoint extraction and three-dimensional keypoint generation for an athlete-of-interest using the example performance metrics determiner 160 of FIG. 3. In the example of FIG. 12B, the two-dimensional (2D) keypoint extractor 335 extracts example keypoints 1252-1290 for an athlete of interest identified by, for example, the 3D bounding box 1210 of FIG. 12A. In the example of FIG. 12B, a total of twenty-three keypoints are extracted based on joint location or other key markers of positioning: an example right eye 1252, an example left eye 1254, an example right ear 1256, an example left ear 1258, an example nose 1260, an example neck 1262, an example right shoulder 1264, an example right wrist 1266, an example right elbow 1268, an example thorax 1270, an example left shoulder 1272, an example right hip 1274, an example left elbow 1276, an example left wrist 1278, an example left hip 1280, an example pelvis 1282, an example right knee 1284, an example right ankle 1286, an example left ankle 1288, an example left toe 1289, and/or an example left knee 1290. In some examples, other keypoints can be generated based on the performance metrics calculations to be performed. For example, the 3D keypoint generator 340 uses a custom triangulation mathematical model and/or a unique inverse kinematics (IK) solver to generate the example 3D keypoints shown in FIG. 12C. For example, the triangulation mathematical model extracts 3D locations of joints while an IK solver uses kinematic equations to determine joint parameters. In the example of FIG. 12B, the extracted 2D keypoints can be used to determine joint connections 1293, 1294, 1296, 1297, 1298. As such, the 3D joint locations can be generated based on the bounding box information obtained from camera views 1202, 1204, 1206, 1208 for each athlete of interest. Once joint angles are calculated using inverse kinematics equations, a motion profile for the athlete of interest can be generated using the 3D keypoints and/or changes in positions of the keypoints over time.

FIG. 13A is a flowchart 1300 representative of example machine readable instructions which may be executed to implement the example capture system module 140 of FIG. 2. In particular, FIG. 13A illustrates example instructions that may be executed by the PTU controller 210 of FIG. 2 to adjust a position of the respective image capture devices 122, 124 in response to movement of the subject to maintain the subject in the image capture device view.

In the example of FIG. 13A, the capture system module 140 determines whether the motion detection machine learning model 260 has been trained (block 1305). If the model has not been trained, control proceeds to block 1350.

At block 1307, the PTU controller 210 instructs the image capture devices 122, 124 to operate in an initial orientation (e.g., lens angle, tilt position). The PTU controller 210 of the capture system module 140 executes the motion detection model 260 to detect a subject(s) of interest (e.g., a lead track runner, a group of runner) are in the image data generated by image capture device(s) 122, 370, 124 based on, for instance, recognition techniques such as, for instance, facial recognition, bounding box detection, segmentation, skeletal keypoints, and path pattern (block 1310). If subject(s) are detected in the image data, the PTU controller 210 executes the motion detection model 260 to monitor the position of the subject(s) over time to detect changes in the position(s) of the subject(s) in the image data (e.g., based on changes in coordinate locations of one or more portions of the respective subject(s)).

In some examples, the PTU controller 210 instructs the image capture device(s) 122, 124 to adjust orientation based on detection of the subject(s) to maintain the subject(s) in the image capture device view (e.g., to center the subjects in the view) (block 1315). Control proceeds to block 1320, where the PTU controller 210 analyzes the image data (e.g., image data generated some time after the image data analyzed at block 1310) to determine whether the subject(s) have changed position (block 1320). For example, the PTU controller 210 can determine changes in coordinate positions of one or more portions of the respective subject(s) in the image data reflecting movement of the subject(s) relative to the view captured by the image capture devices(s) 122, 124, In such examples, the PTU controller 210 instructs the image capture device(s) 122, 370, 124 to adjust orientation (e.g., lens angle, tilt position, rotational position) to maintain the subject(s) in the image capture device view (block 325).

FIG. 13B is a flowchart representative of example machine readable instructions 1350 which, when executed by a computing system of FIG. 2, cause the computing system to train a neural network to generate a motion detection model. The trainer 245 accesses training data 235 (block 1355). The training data can include image data including subject(s) in different locations or positions in an environment captured in the image data, where coordinate positions of one or more portions of the subject is labeled. The trainer 245 identifies data features represented by the training data 235 (e.g., changes in position of the subject between image frames) (block 1360). The training controller 240 instructs the trainer 245 to perform training of the neural network using the training data 235 to generate a motion detection model (block 1365). In the example of FIG. 13B, the machine learning model is a motion detection model 260. In some examples, additional training is performed to refine the model 260 (block 1370).

FIG. 14 illustrates example person detector latency scaling 1400 in accordance with teachings of this disclosure and, in particular, illustrates frame-by-frame analysis allowing scaling and parallelization of multiple cloud nodes to achieve improved latency performance using the example capture device subsystem 120, performance metric determiner 160, and/or the edge network device(s) 170 of FIG. 1. As disclosed herein, the multi-view associator 330 generates a separate cloud node for each subject of interest and each image capture device view, thereby reducing latency and improving processing efficiency. For example, the deployment and management of the performance metrics determiner 160 can rely on a select number of worker nodes that can be scaled to achieve a desired latency. This can be accomplished by allowing the worker node to move on to the next available frame once processing of one frame is complete. Such a set up can be replicated for all camera streams in parallel. In the example of FIG. 14, a total of three frames (e.g., video frames) are shown with individual frame-by-frame processing, including an example first frame 1404, an example second frame 1412, and an example third frame 1416. The first frame 1404 includes an example Athlete Detector Tracker (ADT) input latency 1406, an example fetch/decode latency 1308, an example ADT interference latency 1410, all of which span a period of approximately 100 milliseconds (e.g., based on an example time frame 1402). The second frame 1412 includes an example stream-buffer (SB) and throughput time (TPT) section 1414 of the frame, including the ADT input latency 1406, the fetch/decode latency 1408, and the ADT interference latency 1410, all over a period of 125 milliseconds. The third frame 1416 includes the same sections, with a duration of 150 milliseconds as a result of an additional SB and TPT section 1414. In the example of FIG. 14, the SB instance consumes the video stream, listening or a start and a stop signal. Once the SB instance receives a start signal, each individual frame is written out and metadata extracted (e.g., to a JavaScript Object Notation (JSON) format) that can be consumed by downstream modules. As such, SB throughput can achieve real-time processing demands needed for individual frame processing with low latency. Specifically, scaling out the number of worker nodes used, in addition to parallelization of multiple camera streams, allows for real-time throughput required for a given module of the performance metric determiner 160. For example, once a worker node completes the processing of one frame, it can proceed to the next available frame, which can be replicated for all camera streams in parallel.

FIG. 15 is a block diagram of an example processing platform structured to execute the instructions of FIGS. 4, 6, 7, 8, 9 and/or 10 to implement the example performance metric determiner 160 of FIGS. 1 and/or 3. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example image resolution augmenter 305, the example subject detector 310, the example bounding box generator 315, the example tracker 320, the example identifier 325, the example multi-view associator 330, the example two-dimensional (2D) keypoint extractor 335, the example three-dimensional (3D) keypoint generator 340, the example biomechanics analyzer 345, the example performance metrics calculator 350.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIGS. 4, 6, 7, 8, 9, and/or 10 may be stored in the mass storage device 1528, in the volatile memory 1514, in the non-volatile memory 1516, and/or on a removable non-transitory computer readable storage medium such as a CD or DVD.

FIG. 16 is a block diagram of an example processing platform 1600 structured to execute the instructions of FIG. 5A to implement the example second computing system 358 of FIG. 3. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example neural network processor 368, the example trainer 366, and the example training controller 364.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives.

The machine executable instructions 1632 of FIG. 5A may be stored in the mass storage device 1628, in the volatile memory 1614, in the non-volatile memory 1616, and/or on a removable non-transitory computer readable storage medium such as a CD or DVD.

FIG. 17 is a block diagram of an example processing platform 1700 structured to execute the instructions of FIG. 5B to implement the example third computing system 373 of FIG. 3. The processor platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example neural network processor 380, the example trainer 378, and the example training controller 376.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

The machine executable instructions 1732 of FIG. 5B may be stored in the mass storage device 1728, in the volatile memory 1714, in the non-volatile memory 1716, and/or on a removable non-transitory computer readable storage medium such as a CD or DVD.

FIG. 18 is a block diagram of an example processing platform 1800 structured to execute the instructions of FIG. 5C to implement the example fourth computing system 384 of FIG. 3. The processor platform 1800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example neural network processor 389, the example trainer 388, and the example training controller 387.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, and/or a PCI express interface.

In the illustrated example, one or more input devices 1822 are connected to the interface circuit 1820. The input device(s) 1822 permit(s) a user to enter data and/or commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1820 of the illustrated example, thus, typically includes a graphics driver card, a graphics driver chip and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and digital versatile disk (DVD) drives.

The machine executable instructions 1832 of FIG. 5C may be stored in the mass storage device 1828, in the volatile memory 1814, in the non-volatile memory 1816, and/or on a removable non-transitory computer readable storage medium such as a CD or DVD.

FIG. 19 is a block diagram of an example processing platform 1900 structured to execute the instructions of FIG. 5D to implement the example fifth computing system 392 of FIG. 3. The processor platform 1900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example neural network processor 397, the example trainer 396, and the example training controller 395.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), a Bluetooth® interface, a near field communication (NFC) interface, and/or a PCI express interface.

In the illustrated example, one or more input devices 1922 are connected to the interface circuit 1920. The input device(s) 1922 permit(s) a user to enter data and/or commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1920 of the illustrated example, thus, typically includes a graphics driver card, a graphics driver chip and/or a graphics driver processor.

The interface circuit 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, redundant array of independent disks (RAID) systems, and digital versatile disk (DVD) drives.

The machine executable instructions 1932 of FIG. 5D may be stored in the mass storage device 1928, in the volatile memory 1914, in the non-volatile memory 1916, and/or on a removable non-transitory computer readable storage medium such as a CD or DVD.

FIG. 20 is a block diagram of an example processing platform 2000 structured to implement the example camera system module 140 of FIGS. 1 and 2. The processor platform 2000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example camera receiver 205, the example PTU controller 210, and/or the example encoder 215.

The processor 2012 of the illustrated example includes a local memory 2013 (e.g., a cache). The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a universal serial bus (USB), a Bluetooth® interface, a near field communication (NFC) interface, and/or a PCI express interface.

In the illustrated example, one or more input devices 2022 are connected to the interface circuit 2020. The input device(s) 2022 permit(s) a user to enter data and/or commands into the processor 2012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2024 are also connected to the interface circuit 2020 of the illustrated example. The output devices 2024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2020 of the illustrated example, thus, typically includes a graphics driver card, a graphics driver chip and/or a graphics driver processor.

The interface circuit 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, redundant array of independent disks (RAID) systems, and digital versatile disk (DVD) drives.

The machine executable instructions 2032 of FIG. 4 may be stored in the mass storage device 2028, in the volatile memory 2014, in the non-volatile memory 2016, and/or on a removable non-transitory computer readable storage medium such as a CD or DVD.

FIG. 21 is a block diagram of an example processing platform 2100 structured to execute the instructions of FIG. 13B to implement the example first computing system 225 of FIG. 2. The processor platform 2100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 2100 of the illustrated example includes a processor 2112. The processor 2112 of the illustrated example is hardware. For example, the processor 2112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example neural network processor 250, the example trainer 245, and the example training controller 240.

The processor 2112 of the illustrated example includes a local memory 2113 (e.g., a cache). The processor 2112 of the illustrated example is in communication with a main memory including a volatile memory 2114 and a non-volatile memory 2116 via a bus 2118. The volatile memory 2114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2116 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a universal serial bus (USB), a Bluetooth® interface, a near field communication (NFC) interface, and/or a PCI express interface.

In the illustrated example, one or more input devices 2122 are connected to the interface circuit 2120. The input device(s) 2122 permit(s) a user to enter data and/or commands into the processor 2112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2124 are also connected to the interface circuit 2120 of the illustrated example. The output devices 2124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2120 of the illustrated example, thus, typically includes a graphics driver card, a graphics driver chip and/or a graphics driver processor.

The interface circuit 2120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2100 of the illustrated example also includes one or more mass storage devices 2128 for storing software and/or data. Examples of such mass storage devices 2128 include floppy disk drives, hard drive disks, compact disk drives, Blu-ray disk drives, redundant array of independent disks (RAID) systems, and digital versatile disk (DVD) drives.

The machine executable instructions 2132 of FIG. 13B may be stored in the mass storage device 2128, in the volatile memory 2114, in the non-volatile memory 2116, and/or on a removable non-transitory computer readable storage medium such as a CD or DVD.

A block diagram illustrating an example software distribution platform 2205 to distribute software such as the example computer readable instructions 1532, 1632, 1732, 1832, 1932, 2132 of FIGS. 15, 16, 17, 18, 19 and/or 21 to third parties is illustrated in FIG. 22. The example software distribution platform 2205 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1532, 1632, 1732, 1832, 1932, 2132 of FIGS. 15, 16, 17, 18, 19 and/or 21. The third parties may be consumers, users, retailers, OEMs, etc., who purchase and/or license the software for use and/or re-sale and/or sub-licensing. In the illustrated example, the software distribution platform 2205 includes one or more servers and one or more storage devices. The storage devices store the computer readable instructions 1532, 1632, 1732, 1832, 1932, 2132 which may correspond to the example computer readable instructions 1532, 1632, 1732, 1832, 1932, and/or 2132 of FIGS. 4, 5A, 5B, 5C, 5D, 6, 7, 8, 9, 10, 13A, and/or 13B as described above. The one or more servers of the example software distribution platform 2205 are in communication with a network 2210, which may correspond to any one or more of the Internet and/or any of the example networks 150 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1532, 1632, 1732, 1832, 1932, 2132 from the software distribution platform 2205. For example, the software, which may correspond to the example computer readable instructions 1532, 1632, 1732, 1832, 1932, 2132, may be downloaded to any of the example processor platform(s) 1500, 1600, 1700, 1800, 1900, 2100 which are to execute the computer readable instructions 1532, 1632, 1732, 1832, 1932, 2132 to implement the performance metrics determiner 160 and/or the computing systems 358, 373, 384, 392. In some example, one or more servers of the software distribution platform 1905 periodically offer, transmit, and/or force updates to the software (e.g., the example computer readable instructions 1532, 1632, 1732, 1832, 1932, 2132) to ensure improvements, patches, updates, etc. are distributed and applied to the software at the end user devices.

From the foregoing, it will be appreciated that example methods, apparatus and articles of manufacture have been disclosed that achieve multi-person performance metric extraction. In the examples disclosed herein, image data streams corresponding to multiple image device capture views (e.g., from a one or more image capture devices) can be obtained as part of the multi-person tracking. The examples disclosed herein process the input data from the image capture devices using neural networks trained and optimized to handled occluded views. In the examples disclosed herein, the camera streams for each camera view are input into a detector and tracker module to assign and maintain a set of unique identifiers for each subject-of-interest (e.g., an athlete). The detector and tracker module results are provided to a multi-view association-based neural network to associate each image device capture view with the given subject-of-interest. In the examples disclosed herein, output generated by a multi-view association-based neural network can be fed into a two-dimensional skeletal neural network and a three-dimensional triangulation module to obtain three-dimensional joint mapping used to determine multi-performance metrics (e.g., biomechanical analysis) in real-time. As such, the examples disclosed herein allow for use of computer vision-based neural networks to detect and extract joint keypoints used in the evaluation of performance metrics during multi-person events that introduce high occlusion frequencies. Examples disclosed herein can be used, for instance, during sporting events with multiple athletes requiring athlete-specific performance metric identification based on highly-accurate joint detection (e.g., velocity, stride length, shoulder sway, power angle, etc.). Furthermore, the methods and apparatus disclosed herein result in a highly accurate and ultra-low latency network that can support real-time processing through parallelization of multiple camera streams.

Example methods, apparatus, systems, and articles of manufacture for extraction and calculation of multi-person performance metrics in a three-dimensional space are disclosed herein. Further examples and combinations thereof include the following:

Example 1 includes an apparatus, comprising a detector to identify a first subject in a first image captured by a first image capture device based on a first set of two-dimensional kinematic keypoints in the first image, the first set of two-dimensional kinematic keypoints corresponding to one or more joints of the first subject, the first image capture device associated with a first view of the first subject, a multi-view associator to verify the first subject using the first image and a second image captured by a second image capture device, the second image capture device associated with a second view of the first subject, the second view different than the first view, a keypoint generator to generate three-dimensional keypoints for the first subject using the first set of two-dimensional kinematic keypoints and a second set of keypoints in the second image, and a biomechanics analyzer to determine a performance metric for the first subject using the three-dimensional keypoints.

Example 2 includes the apparatus of example 1, further including a bounding box generator to generate a first bounding box for the first subject in the first image and a second bounding box for a second subject in the second image, the multi-view associator to identify the first subject in the first image using the first bounding box and in the second image using the second bounding box.

Example 3 includes the apparatus of example 2, further including a tracker to assign a first subject identifier to the first bounding box and a second subject identifier to the second bounding box, the multi-view associator to associate the first subject identifier and the second subject identifier with the first subject.

Example 4 includes the apparatus of examples 1 or 2, further including an image augmenter to increase a resolution of at least one of the first image or the second image.

Example 5 includes the apparatus of example 3, wherein the multi-view associator is to execute a neural network model to associate the first subject identifier and the second subject identifier with the first subject.

Example 6 includes the apparatus of example 1, wherein the keypoint generator is to identify twenty-three three-dimensional keypoints for the first subject based on the first view of the first image capture device and the second view of the second image capture device.

Example 7 includes the apparatus of examples 1, 2, or 6, wherein the first image and the second image each include a second subject, the detector to identify the second subject based on a third set of two-dimensional kinematic keypoints in the first image and a fourth set of two-dimensional kinematic keypoints in the second image.

Example 8 includes the apparatus of example 7, wherein the detector is to identify the first subject as a subject of interest based on a number of two-dimensional kinematic keypoints in the first set of two-dimensional kinematic keypoints and to refrain from identifying the second subject as the subject of interest based on a number of two-dimensional kinematic keypoints in the third set of two-dimensional kinematic keypoints.

Example 9 includes the apparatus of example 7, wherein the performance metric is a first performance metric and the biomechanics analyzer is to determine a second performance metric for the second subject.

Example 10 includes the apparatus of example 1, wherein the detector is to execute a two-dimensional pose estimation algorithm to identify the first set of two-dimensional kinematic keypoints.

Example 11 includes the apparatus example 1, wherein the keypoint generator is to execute a triangulation model or an inverse kinematics solver to generate three-dimensional keypoints.

Example 12 includes the apparatus of any of examples 1-11, wherein the performance metric includes one or more of velocity, acceleration, shoulder sway, center of mass, or stride frequency of the first subject.

Example 13 includes the apparatus of example 1, wherein the biomechanics analyzer is to assign a first weight to one or more of the three-dimensional keypoints to determine a first performance metric and assign a second weight to the one or more of the three-dimensional keypoints to determine a second performance metric, the second performance metric different than the first performance metric.

Example 14 includes a system comprising a first image capture device to generate first image data, the first image data including a first view of a subject, a second image capture device to generate second image data, the second image data including a second view of the subject, and a processor to predict first positions of two-dimensional keypoints of the subject based on the first image data, assign a first identifier to the subject in the first image data based on the first positions of the two-dimensional keypoints, predict second positions of two-dimensional keypoints of the subject based on the second image data, assign a second identifier to the subject in the second image data based on the second positions of two-dimensional keypoints, identify the subject as a first subject in the first image data and the second image based on the first identifier and the second identifier, predict three-dimensional keypoints for the first subject based on the first positions of the two-dimensional keypoints and the second positions of the two-dimensional keypoints in the second image, and determine a performance metric for the subject using the three-dimensional keypoints.

Example 15 includes the system of example 14, wherein the processor is to predict the first positions of the two-dimensional keypoints of the first subject based on the first image data and the second positions of the two-dimensional keypoints of the first subject based on the second image data substantially concurrently.

Example 16 includes the system of example 15, wherein the processor is to generate a first bounding box for the first subject in the first image and a second bounding box for the second subject in the second image.

Example 17 includes the system of example 16, wherein the processor is to identify the first subject in the first image using the first bounding box and in the second image using the second bounding box.

Example 18 includes the system of example 17, wherein the processor is to assign a first subject identifier to the first bounding box and a second subject identifier to the second bounding box, the processor to associate the first subject identifier and the second subject identifier with the first subject.

Example 19 includes the system of example 18, wherein the processor is to execute a neural network model to associate the first subject identifier and the second subject identifier with the first subject.

Example 20 includes a method, comprising identifying, by executing an instruction with at least one processor, a first subject in a first image captured by a first image capture device based on a first set of two-dimensional kinematic keypoints in the first image, the first set of two-dimensional kinematic keypoints corresponding to one or more joints of the first subject, the first image capture device associated with a first view of the first subject, verifying, by executing an instruction with the at least one processor, the first subject using the first image and a second image captured by a second image capture device, the second image capture device associated with a second view of the first subject, the second view different than the first view, generating, by executing an instruction with the at least one processor, three-dimensional keypoints for the first subject using the first set of two-dimensional kinematic keypoints and a second set of keypoints in the second image, and determining, by executing an instruction with the at least one processor, a performance metric for the first subject using the three-dimensional keypoints.

Example 21 includes the method of example 20, further including generating a first bounding box for the first subject in the first image and a second bounding box for a second subject in the second image, and identifying the first subject in the first image using the first bounding box and in the second image using the second bounding box.

Example 22 includes the method of example 21, further including assigning a first subject identifier to the first bounding box and a second subject identifier to the second bounding box and associating the first subject identifier and the second subject identifier with the first subject.

Example 23 includes the method of example 22, further including executing a neural network model to associate the first subject identifier and the second subject identifier with the first subject.

Example 24 includes the method of examples 20 or 21, further including increasing a resolution of at least one of the first image or the second image.

Example 25 includes the method of example 20, further including identifying twenty-three three-dimensional keypoints for the first subject based on the first view of the first image capture device and the second view of the second image capture device.

Example 26 includes At least one non-transitory computer readable medium comprising instructions that, when executed, cause at least one processor to at least identify a first subject in a first image captured by a first image capture device based on a first set of two-dimensional kinematic keypoints in the first image, the first set of two-dimensional kinematic keypoints corresponding to one or more joints of the first subject, the first image capture device associated with a first view of the first subject, verify the first subject using the first image and a second image captured by a second image capture device, the second image capture device associated with a second view of the first subject, the second view different than the first view, generate three-dimensional keypoints for the first subject using the first set of two-dimensional kinematic keypoints and a second set of keypoints in the second image, and determine a performance metric for the first subject using the three-dimensional keypoints.

Example 27 includes the at least one non-transitory computer readable medium as defined in example 26, wherein the instructions, when executed, cause the at least one processor to generate a first bounding box for the first subject in the first image and a second bounding box for a second subject in the second image, and identify the first subject in the first image using the first bounding box and in the second image using the second bounding box.

Example 28 includes the at least one non-transitory computer readable medium as defined in example 27, wherein the instructions, when executed, cause the at least one processor to assign a first subject identifier to the first bounding box and a second subject identifier to the second bounding box, and associate the first subject identifier and the second subject identifier with the first subject.

Example 29 includes the at least one non-transitory computer readable medium as defined in example 28, wherein the instructions, when executed, cause the at least one processor to execute a neural network model to associate the first subject identifier and the second subject identifier with the first subject.

Example 30 includes the at least one non-transitory computer readable medium as defined in example 26, wherein the instructions, when executed, cause the at least one processor to increase a resolution of at least one of the first image or the second image.

Example 31 includes the at least one non-transitory computer readable medium as defined in example 26, wherein the instructions, when executed, cause the at least one processor to identify twenty-three three-dimensional keypoints for the first subject based on the first view of the first image capture device and the second view of the second image capture device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus, comprising:
   a detector to:
      identify a first subject in a first image captured by a first image capture device based on a first set of two-dimensional kinematic keypoints in the first image, the first set of two-dimensional kinematic keypoints corresponding to one or more joints of the first subject, the first image capture device associated with a first view of the first subject; and
      assign a first subject identifier to the first subject in the first image, the first subject identifier different than the first set of two-dimensional kinematic keypoints;
   a multi-view associator to verify the first subject in the first image using the first subject identifier and a second subject identifier, the second subject identifier assigned to the first subject in a second image captured by a second image capture device, the second image capture device associated with a second view of the first subject, the second view different than the first view;
   a keypoint generator to generate three-dimensional keypoints for the first subject using the first set of two-dimensional kinematic keypoints and a second set of keypoints in the second image; and
   a biomechanics analyzer to determine a performance metric for the first subject using the three-dimensional keypoints.

2. The apparatus of claim 1, further including a bounding box generator to generate a first bounding box for the first subject in the first image and a second bounding box for a second subject in the second image, the multi-view associator to identify the first subject in the first image using the first bounding box and in the second image using the second bounding box.

3. The apparatus of claim 2, further including a tracker to assign the first subject identifier to the first bounding box and the second subject identifier to the second bounding box.

4. The apparatus of claim 1, further including an image augmenter to increase a resolution of at least one of the first image or the second image.

5. The apparatus of claim 1, wherein the multi-view associator is to execute a neural network model to associate the first subject identifier and the second subject identifier with the first subject.

6. The apparatus of claim 1, wherein the first image and the second image each include a second subject, the detector to identify the second subject based on a third set of two-dimensional kinematic keypoints in the first image and a fourth set of two-dimensional kinematic keypoints in the second image.

7. The apparatus of claim 1, wherein the detector is to execute a two-dimensional pose estimation algorithm to identify the first set of two-dimensional kinematic keypoints.

8. The apparatus of claim 1, wherein the performance metric includes one or more of velocity, acceleration, shoulder sway, center of mass, or stride frequency of the first subject.

9. The apparatus of claim 1, wherein the biomechanics analyzer is to assign a first weight to one or more of the three-dimensional keypoints to determine a first performance metric and assign a second weight to the one or more of the three-dimensional keypoints to determine a second performance metric, the second performance metric different than the first performance metric.

10. A system comprising:
   a first image capture device to generate first image data, the first image data including a first view of a subject;
   a second image capture device to generate second image data, the second image data including a second view of the subject;
   at least one memory;
   machine-readable instructions; and
   a processor to execute the machine-readable instructions to:
      predict first positions of two-dimensional keypoints of the subject based on the first image data;
      assign a first subject identifier to the subject in the first image data based on the first positions of the two-dimensional keypoints, the first subject identifier different than the two-dimensional keypoints of the subject associated with the first image data;
      predict second positions of two-dimensional keypoints of the subject based on the second image data;
      assign a second subject identifier to the subject in the second image data based on the second positions of two-dimensional keypoints, the second subject identifier different than the two-dimensional keypoints of the subject associated with the second image data;
identify the subject as a first subject in the first image data and the second image data based on the first subject identifier and the second subject identifier;
predict three-dimensional keypoints for the first subject based on the first positions of the two-dimensional keypoints and the second positions of the two-dimensional keypoints in the second image data; and
determine a performance metric for the subject using the three-dimensional keypoints.

11. The system of claim 10, wherein the processor is to predict the first positions of the two-dimensional keypoints of the first subject based on the first image data and the second positions of the two-dimensional keypoints of the first subject based on the second image data substantially concurrently.

12. The system of claim 11, wherein the processor is to generate a first bounding box for the first subject in the first image data and a second bounding box for the second subject in the second image data.

13. The system of claim 12, wherein the processor is to identify the first subject in the first image data using the first bounding box and in the second image data using the second bounding box.

14. The system of claim 13, wherein the processor is to assign the first subject identifier to the first bounding box and the second subject identifier to the second bounding box.

15. The system of claim 10, wherein the processor is to execute a neural network model to associate the first subject identifier and the second subject identifier with the first subject.

16. At least one non-transitory computer readable medium comprising instructions that, when executed, cause at least one processor to at least:
identify a first subject in a first image captured by a first image capture device based on a first set of two-dimensional kinematic keypoints in the first image, the first set of two-dimensional kinematic keypoints corresponding to one or more joints of the first subject, the first image capture device associated with a first view of the first subject;
assign a first subject identifier to the first subject in the first image, the first subject identifier different than the first set of two-dimensional kinematic keypoints;
verify the first subject in the first image using the first subject identifier and a second subject identifier, the second subject identifier assigned to the first subject in a second image captured by a second image capture device, the second image capture device associated with a second view of the first subject, the second view different than the first view;
generate three-dimensional keypoints for the first subject using the first set of two-dimensional kinematic keypoints and a second set of keypoints in the second image; and
determine a performance metric for the first subject using the three-dimensional keypoints.

17. The at least one non-transitory computer readable medium as defined in claim 16, wherein the instructions, when executed, cause the at least one processor to generate a first bounding box for the first subject in the first image and a second bounding box for a second subject in the second image, and identify the first subject in the first image using the first bounding box and in the second image using the second bounding box.

18. The at least one non-transitory computer readable medium as defined in claim 17, wherein the instructions, when executed, cause the at least one processor to assign the first subject identifier to the first bounding box and the second subject identifier to the second bounding box.

19. The at least one non-transitory computer readable medium as defined in claim 16, wherein the instructions, when executed, cause the at least one processor to execute a neural network model to associate the first subject identifier and the second subject identifier with the first subject.

20. The at least one non-transitory computer readable medium as defined in claim 16, wherein the instructions, when executed, cause the at least one processor to increase a resolution of at least one of the first image or the second image.

21. An apparatus, comprising:
at least one memory;
machine-readable instructions; and
processor circuitry to execute the machine-readable instructions to:
identify a first subject in a first image captured by a first image capture device based on a first set of two-dimensional kinematic keypoints in the first image, the first set of two-dimensional kinematic keypoints corresponding to one or more joints of the first subject, the first image capture device associated with a first view of the first subject;
assign a first subject identifier to the first subject in the first image, the first subject identifier different than the first set of two-dimensional kinematic keypoints;
verify the first subject in the first image using the first subject identifier and a second subject identifier, the second subject identifier assigned to the first subject in a second image captured by a second image capture device, the second image capture device associated with a second view of the first subject, the second view different than the first view;
generate three-dimensional keypoints for the first subject using the first set of two-dimensional kinematic keypoints and a second set of keypoints in the second image; and
determine a performance metric for the first subject using the three-dimensional keypoints.

22. The apparatus of claim 21, wherein the processor circuitry is to:
generate a first bounding box for the first subject in the first image and a second bounding box for a second subject in the second image; and
identify the first subject in the first image using the first bounding box and in the second image using the second bounding box.

23. The apparatus of claim 22, wherein the processor circuitry is to assign the first subject identifier to the first bounding box and the second subject identifier to the second bounding box.

24. The apparatus of claim 21, wherein the processor circuitry is to execute a neural network model to associate the first subject identifier and the second subject identifier with the first subject.

25. The apparatus of claim 21, wherein the first image and the second image each include a second subject, the processor circuitry is to identify the second subject based on a third set of two-dimensional kinematic keypoints in the first image and a fourth set of two-dimensional kinematic keypoints in the second image.

26. The apparatus of claim 21, wherein the processor circuitry is to execute a two-dimensional pose estimation algorithm to identify the first set of two-dimensional kinematic keypoints.

27. The apparatus of claim 21, wherein the performance metric includes one or more of velocity, acceleration, shoulder sway, center of mass, or stride frequency of the first subject.

28. The apparatus of claim 21, wherein the processor circuitry is to assign a first weight to one or more of the three-dimensional keypoints to determine a first performance metric and assign a second weight to the one or more of the three-dimensional keypoints to determine a second performance metric, the second performance metric different than the first performance metric.

* * * * *